(12) United States Patent
Maniwa et al.

(10) Patent No.: US 11,838,632 B2
(45) Date of Patent: Dec. 5, 2023

(54) DRIVING CONTROL APPARATUS, IMAGE PICKUP APPARATUS, AND CONTROL METHOD

(71) Applicant: CANON KABUSHIKI KAISHA, Tokyo (JP)

(72) Inventors: Junichi Maniwa, Tokyo (JP); Kenya Fukabori, Tokyo (JP); Yusuke Kazami, Kanagawa (JP); Takeshi Omata, Kanagawa (JP); Sairi Iwata, Kanagawa (JP); Ryota Ogawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/061,551

(22) Filed: Dec. 5, 2022

(65) Prior Publication Data

US 2023/0179864 A1 Jun. 8, 2023

(30) Foreign Application Priority Data

Dec. 8, 2021 (JP) .................................. 2021-199261
Sep. 13, 2022 (JP) .................................. 2022-145279

(51) Int. Cl.
*H04N 23/68* (2023.01)

(52) U.S. Cl.
CPC ................................ *H04N 23/685* (2023.01)

(58) Field of Classification Search
CPC ............... H04N 23/685; H04N 23/695; H04N 23/6812; H02N 2/00
See application file for complete search history.

(56) References Cited

U.S. PATENT DOCUMENTS

| 5,130,619 A * | 7/1992 | Izuno ..................... H02N 2/163 318/116 |
| 5,644,199 A * | 7/1997 | Nojima .................. H02N 2/166 310/314 |
| 11,439,435 B2 * | 9/2022 | Matsumoto ............ A61B 17/43 |
| 2007/0108870 A1 * | 5/2007 | Atsuta .................... H02N 2/026 310/317 |
| 2012/0177354 A1 * | 7/2012 | Ashizawa .......... G02B 27/1006 310/317 |
| 2015/0125140 A1 * | 5/2015 | Ashizawa .............. H02N 2/163 396/125 |
| 2018/0288332 A1 * | 10/2018 | Nishitani ........... H04N 5/23258 |
| 2021/0099106 A1 * | 4/2021 | Atsuta .................... H02N 2/142 |
| 2021/0184600 A1 * | 6/2021 | Ikeda ....................... G02B 7/08 |

FOREIGN PATENT DOCUMENTS

JP 2021-092717 A 6/2021

* cited by examiner

*Primary Examiner* — Chiawei Chen
(74) *Attorney, Agent, or Firm* — Cowan, Liebowitz & Latman, P.C.

(57) ABSTRACT

A driving control apparatus is configured to control a driving unit that moves relative to each other a vibrator that is excited to vibrate by applying a first driving signal and a second driving signal that have a phase difference with each other, and a contact member that contacts the vibrator. The driving control apparatus includes a first control unit configured to control the phase difference, and a second control unit configured to control a voltage amplitude of each of the first driving signal and the second driving signal. The second control unit controls the voltage amplitude so that a change rate of the voltage amplitude increases as an absolute value of the phase difference decreases.

14 Claims, 23 Drawing Sheets

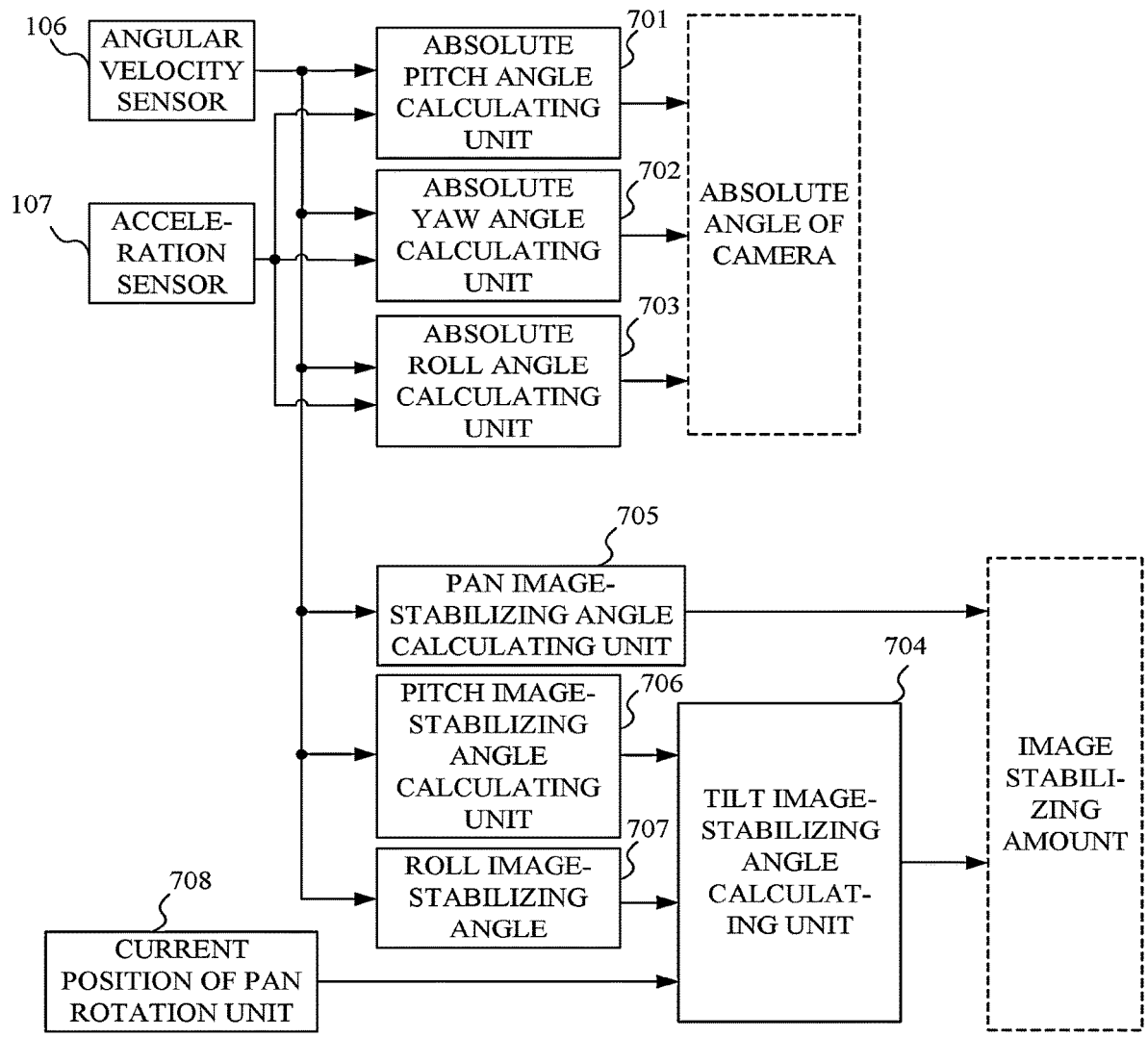
FIG. 7
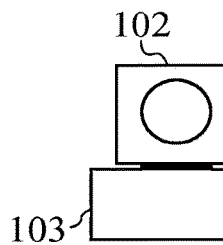
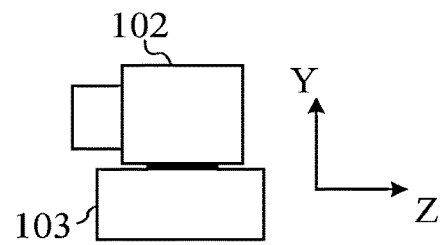
FIG. 8A     FIG. 8B

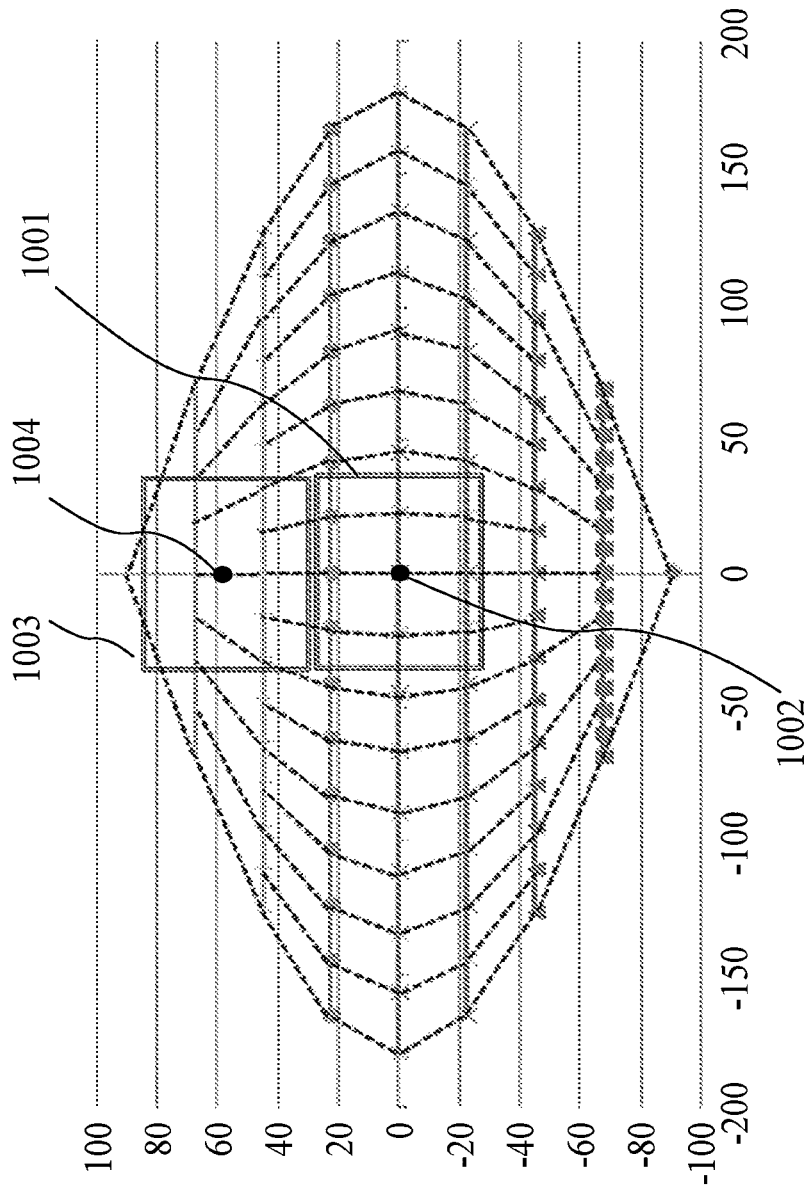
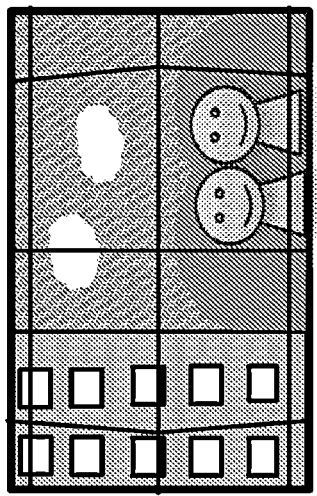
FIG. 10B
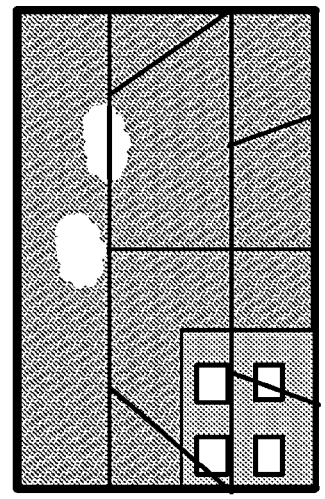
FIG. 10C
FIG. 10A

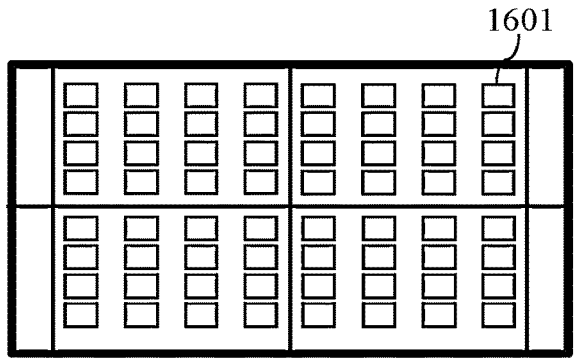
FIG. 16A
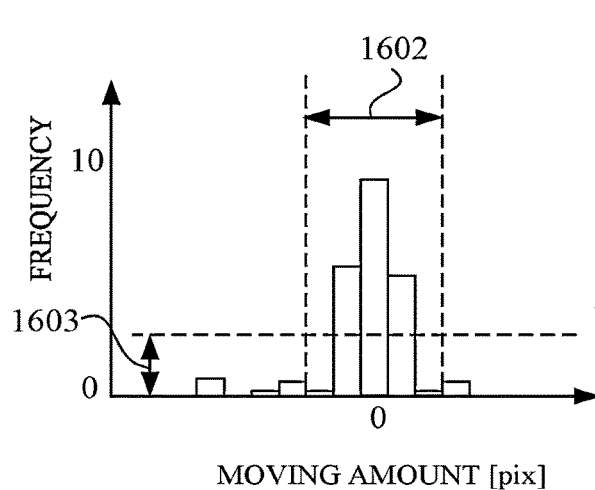
FIG. 16B
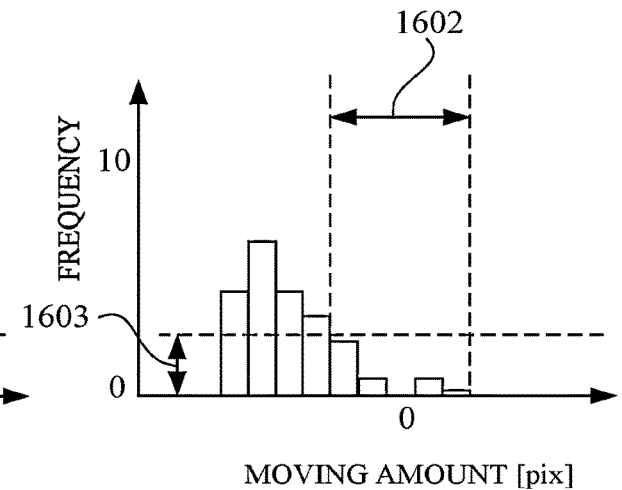
FIG. 16C
| AREA | NOW TO T1 HOURS | T1 HOURS TO T2 HOURS | T2 HOURS TO T3 HOURS | T3 HOURS TO T4 HOURS | ... |
|---|---|---|---|---|---|
| AREA 1 | 0 | 0 | 0 | 2 | |
| AREA 2 | 1 | 1 | 1 | 0 | |
| AREA 3 | 3 | 4 | 2 | 0 | |
| AREA 4 | 2 | 2 | 1 | 0 | |
FIG. 17

| OBJECT REGISTERED AS PERSON | NOW TO T1 HOURS | T1 HOURS TO T2 HOURS | T2 HOURS TO T3 HOURS | T3 HOURS TO T4 HOURS | ... |
|---|---|---|---|---|---|
| Mr. A | 3 | 2 | 0 | 0 | |
| Mr. B | 1 | 2 | 1 | 0 | |
| Mr. C | 0 | 0 | 1 | 4 | |
| Mr. D | 3 | 0 | 0 | 0 | |

| OBJECT REGISTERED AS OBJECT (NON-PERSON) | NOW TO T1 HOURS | T1 HOURS TO T2 HOURS | T2 HOURS TO T3 HOURS | T3 HOURS TO T4 HOURS | ... |
|---|---|---|---|---|---|
| DOG | 2 | 1 | 0 | 0 | |
| CAT | 0 | 0 | 1 | 0 | |

| SCENE | NOW TO T1 HOURS | T1 HOURS TO T2 HOURS | T2 HOURS TO T3 HOURS | T3 HOURS TO T4 HOURS | ... |
|---|---|---|---|---|---|
| BLUE SKY | 0 | 0 | 2 | 2 | |
| EVENING VIEW | 2 | 0 | 0 | 0 | |
| NATURAL GREEN | 0 | 0 | 1 | 4 | |
| NIGHT VIEW | 0 | 0 | 0 | 0 | |

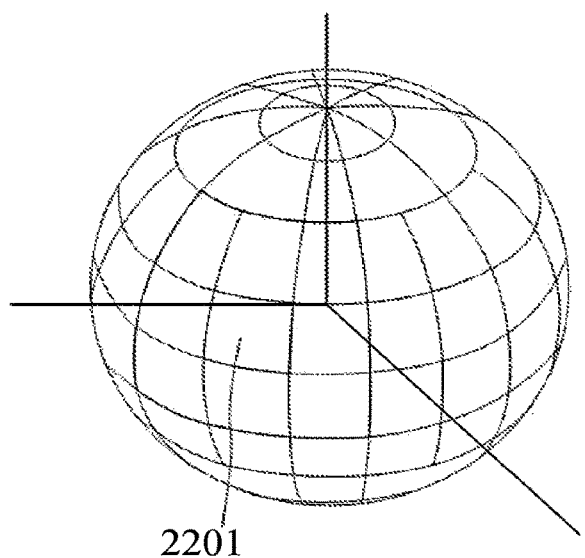
FIG. 22A
FIG. 22B
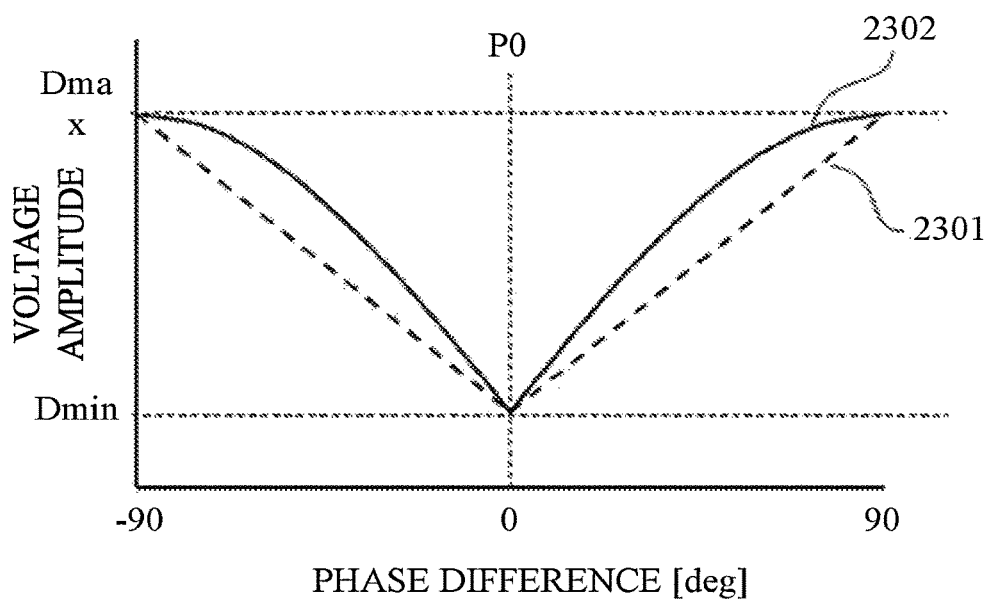
FIG. 23

| VOLTAGE AMPLITUDE | VELOCITY |
|---|---|
| 20 | 10 |
| 30 | 20 |
| 40 | 70 |
| 50 | 100 |

DRIVING CONTROL APPARATUS, IMAGE PICKUP APPARATUS, AND CONTROL METHOD

BACKGROUND

Technical Field

One of the aspects of the disclosure relates to a driving control apparatus, an image pickup apparatus, and a control method.

Description of the Related Art

Japanese Patent Laid-Open No. 2021-92717 discloses a configuration that reduces a voltage amplitude of a driving signal during low-velocity driving of a vibration wave motor, and thereby can suppress unnecessary vibration during the low-velocity driving and reduce driving noise that would occur during the low-velocity driving.

However, reducing the voltage amplitude of the driving signal of the vibration wave motor causes the configuration to be more susceptible to the friction of the driving unit and the driving load, and causes the vibration wave motor to reduce control performance.

SUMMARY

One of the aspects of the disclosure provides a driving control apparatus that can suppress noise and maintain control performance during low-velocity driving of a vibration wave motor.

A driving control apparatus according to one aspect of the disclosure is configured to control a driving unit that moves relative to each other a vibrator that is excited to vibrate by applying a first driving signal and a second driving signal that have a phase difference with each other, and a contact member that contacts the vibrator. The driving control apparatus includes at least one processor, and a memory coupled to the at least one processor, the memory having instructions that, in a case where executed by the processor, perform operations as a first control unit configured to control the phase difference, and a second control unit configured to control a voltage amplitude of each of the first driving signal and the second driving signal. The second control unit controls the voltage amplitude so that a change rate of the voltage amplitude increases as an absolute value of the phase difference or a target velocity of the driving unit decreases.

An image pickup apparatus including the above driving control apparatus and a control method corresponding to the above driving control apparatus also constitute another aspect of the disclosure.

Further features of the disclosure will become apparent from the following description of exemplary embodiments with reference to the attached drawings.

BRIEF DESCRIPTION OF THE DRAWINGS

FIG. 7 explains a method of calculating an absolute angle of the camera and an image stabilizing amount.

FIGS. 8A and 8B explain a direction of the image pickup apparatus.

FIGS. 10A to 10C explain area division in a captured image.

FIGS. 16A to 16C explain motion detection in a captured image.

FIG. 17 explains management of the number of captured images for each area.

FIG. 18 explains management of the number of captured images for each registered object that has received personal authentication.

FIG. 19 explains management of the number of captured images for each registered object that has been recognized as an object (non-person).

FIG. 20 explains management of the number of captured images for each scene.

FIGS. 22A and 22B explain search target angle calculation for each scene.

FIG. 23 illustrates an example of a relationship between a phase difference between voltages applied to the vibrator and a voltage amplitude.

DESCRIPTION OF THE EMBODIMENTS

Figure 1:
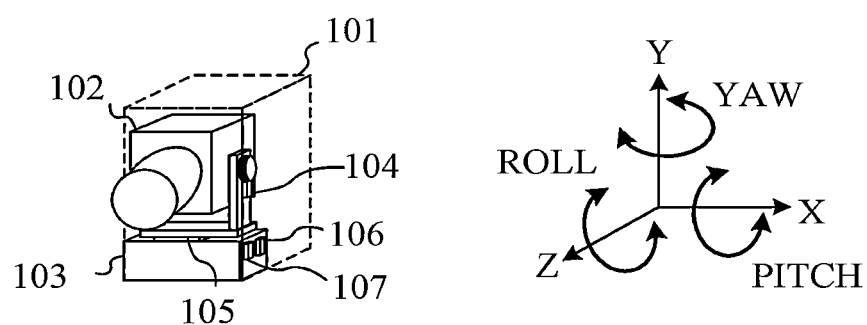
FIG. 1 schematically illustrates an image pickup apparatus according to an embodiment of the disclosure.

Referring now to the accompanying drawings, a detailed description will be given of embodiments according to the disclosure. Corresponding elements in respective figures will be designated by the same reference numerals, and a duplicate description thereof will be omitted.

Configuration of Image Pickup Apparatus

FIG. 1 schematically illustrates an image pickup apparatus (camera hereinafter) 101 according to one embodiment of the disclosure. The camera 101 includes an operation member such as a power switch for operating the camera. A barrel 102 includes an imaging lens unit and an image sensor for imaging, and is attached to the camera 101 and rotatable relative to a fixing unit 103. A tilt rotation unit 104 includes a motor driving mechanism that rotates the barrel 102 in a pitch direction. A pan rotation unit 105 includes a motor driving mechanism that rotates the barrel 102 in a yawing direction. A driving unit includes the tilt rotation unit 104 and the pan rotation unit 105. An angular velocity sensor 106 (gyro sensor) for detecting angular velocities in three axial directions and an acceleration sensor 107 for detecting accelerations in three axial directions are mounted on the fixing unit 103.

Figure 2:
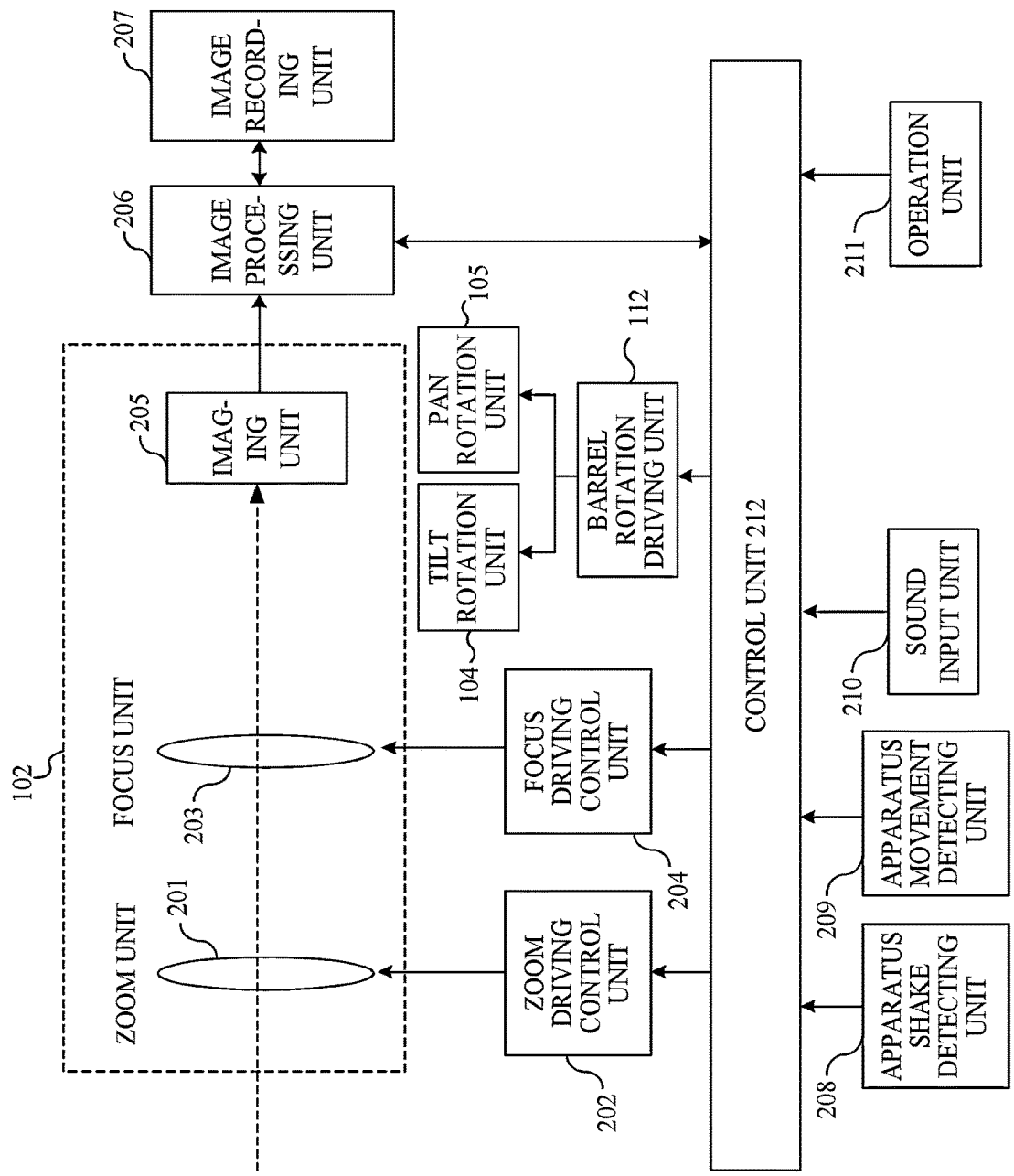
FIG. 2 is a block diagram of the image pickup apparatus.

FIG. 2 is a block diagram of the camera 101. A zoom unit 201 includes a zoom lens that performs magnification variation. A zoom driving control unit 202 controls driving of the zoom unit 201. A focus unit 203 includes a lens for focusing. A focus driving control unit 204 controls driving of the focus unit 203. In an imaging unit 205, the image sensor receives incident light through each lens unit, and outputs charge information corresponding to the light amount as analog image data to an image processing unit 206.

The image processing unit 206 applies image processing such as distortion correction, white balance adjustment, and color interpolation processing to digital image data output by A/D conversion, and outputs applied digital image data. The digital image data output from the image processing unit 206 is converted into a recording format such as a JPEG format, and recorded in a recording medium such as a nonvolatile memory by the image recording unit 207.

A barrel rotation driving unit (driving control apparatus) 112 drives the tilt rotation unit 104 and pan rotation unit 105 to drive the barrel 102 in the tilt and panning directions. The barrel rotation driving unit includes at least one processor, and a memory coupled to the at least one processor, the memory having instructions that, when executed by the processor, perform operations as a first control unit and a second control unit, which will be described below. An apparatus shake detecting unit 208 calculates a rotation angle, a shift amount, etc. of the camera 101 based on signals from the angular velocity sensor 106 and the acceleration sensor 107. An apparatus movement detecting unit 209 detects movement of the camera 101 using positional information from a Global Positioning System (GPS) and movement detecting unit such as an acceleration sensor. GPS may be provided to the camera 101 or an external GPS detecting unit. The movement of the camera 101 can also be detected by the apparatus shake detecting unit 208, but it is difficult for the apparatus shake detecting unit 208 to detect a wide moving range of the camera 101 due to the characteristic of the acceleration sensor. Accordingly, a narrow moving range of the camera 101 is detected by the apparatus shake detecting unit 208, and the wide moving range of the camera 101 is detected by the apparatus movement detecting unit 209. A sound input unit 210 acquires a sound signal from a microphone provided to the camera 101. An operation unit 211 includes the power button and buttons for changing settings of the camera 101. A control unit 212 controls the entire camera 101.

Figure 3:
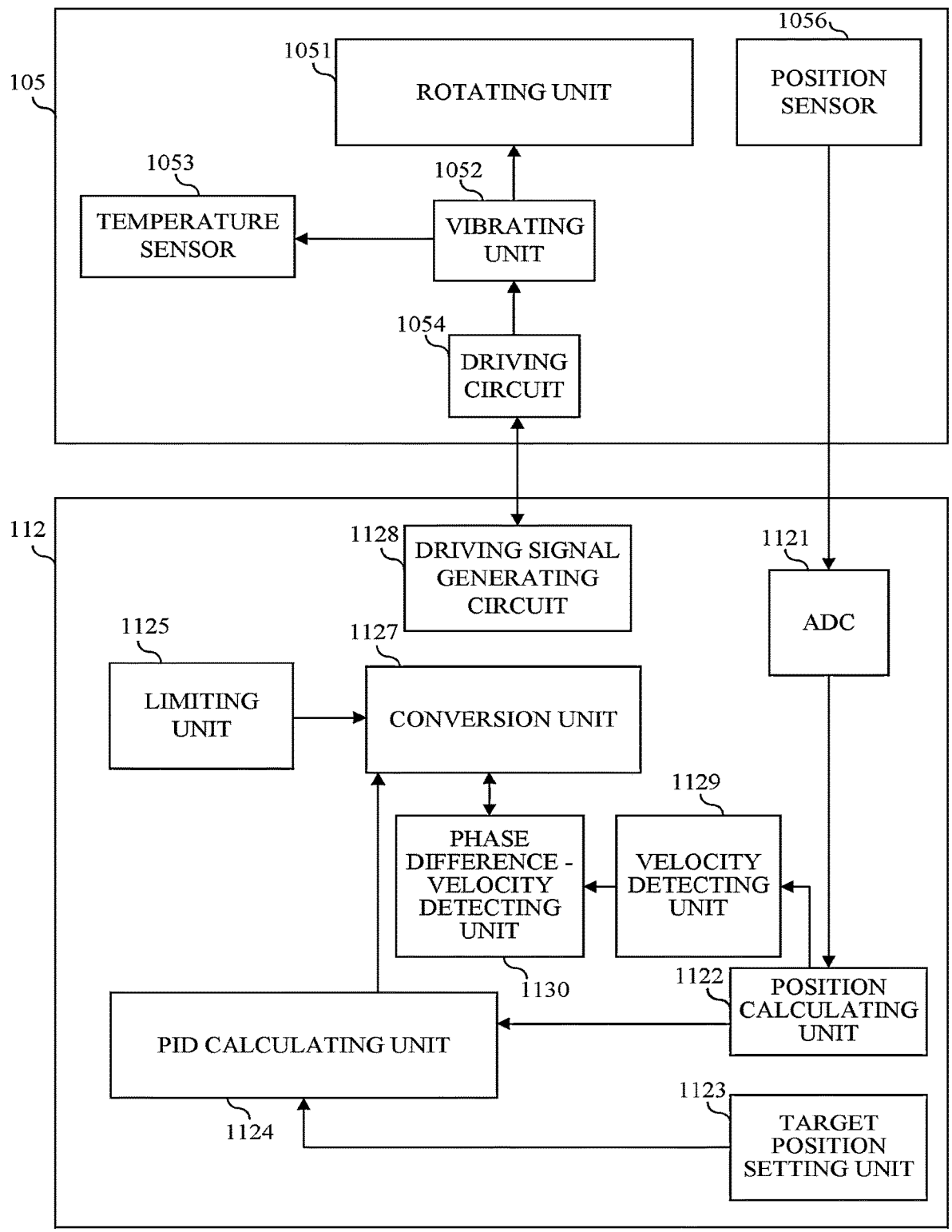
FIG. 3 is a block diagram of a pan rotation unit and a barrel rotation driving unit.

FIG. 3 is a block diagram of the pan rotation unit 105 and the barrel rotation driving unit 112. Since the tilt rotation unit 104 has a configuration similar to that of the pan rotation unit 105 except for a driving shaft, only the pan rotation unit 105 will be described in this embodiment. A rotating unit (contact member) 1051 rotates the barrel 102 in the panning direction. A vibrator 1052 is an actuator in which vibration is excited by applying a first driving signal and a second driving signal having a phase difference, and is used to rotate the rotating unit 1051 in the panning direction. The pan rotation unit 105 moves the vibrator 1052 and the rotating unit 1051 that contacts the vibrator 1052 relative to each other.

Figure 4:
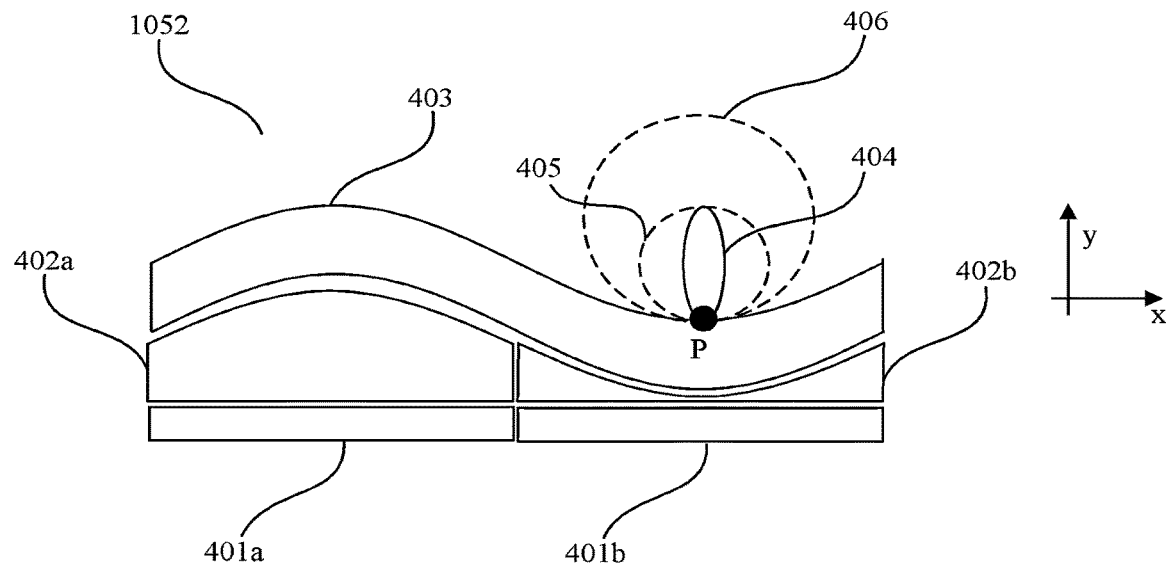
FIG. 4 is a sectional view of a vibrator.

FIG. 4 is a sectional view of the vibrator 1052. In FIG. 4, an x-axis is a moving direction (feeding direction) of the rotating unit 1051, and a y-axis is a direction orthogonal to the moving direction (upthrust direction). The vibrator 1052 includes electrodes 401a and 401b, piezoelectric elements 402a and 402b, and a stator 403. In driving the rotating unit 1051, two-phase voltages with a different phase supplied from a driving circuit 1054 are applied to the electrodes 401a and 401b. In a case where the two-phase voltages are applied to the electrodes 401a and 401b, the piezoelectric elements 402a and 402b expand and contract due to the inverse piezoelectric effect, and two types of standing waves are generated in the stator 403. An approximately elliptical motion is generated at the contact portion between the stator 403 and the rotating unit 1051 by combining the two types of standing waves. In a case where two-phase sinusoidal voltages having a predetermined phase difference are applied to the electrodes 401a and 401b, an elliptical vibration having a locus 404 is generated at a point P of the stator 403. In a case where two-phase voltages having a phase difference larger than that of the two-phase voltages at which the elliptical vibration of the locus 404 is generated are applied to the electrodes 401a and 401b, elliptical vibration having a locus 405 is generated at the point P. The elliptical vibration having the locus 405 has a larger component in the feeding direction than that of the elliptical vibration of locus 404. Thus changing the phase difference between the two-phase voltages can change a ratio of the component in the feeding direction and the component in the upthrust direction, and adjust the driving velocity of the rotating unit 1051. In a case where two-phase voltages having a frequency (driving frequency) lower than that of the two-phase voltages that cause the elliptical vibration having the locus 405 are applied to the electrodes 401a and 401b (approaching the resonance frequency of the vibrator 1052), an elliptical vibration having a locus 406 is generated at the point P. The elliptical vibration having the locus 406 has larger components in the feeding direction and upthrust direction than those of the elliptical vibration having the locus 405. Thus changing the frequency of the two-phase voltages can also change the driving velocity of the rotating unit 1051. Alternatively, the magnitude of the elliptical vibration may be changed by changing the (voltage) amplitude of the two-phase voltages.

An ultrasonic motor as the vibration wave motor according to this embodiment is controlled using a driving frequency in an ultrasonic range higher than the resonance frequency. A velocity controlling method includes a method of fixing a phase difference and of changing the driving frequency (frequency control mode), a method of fixing the driving frequency and changing the phase difference (phase difference control mode), and a method of changing both the driving frequency and the phase difference. The phase difference control mode has a low output but enables highly accurate positioning, and is suitable for a case that requires high accuracy of a stop position, and a case that uses micro-driving. On the other hand, the frequency control mode is suitable for a case that requires the rotating unit 1051 to be moved at high velocity due to its high output, or a case where the load on the vibrator 1052 increases due to a low-temperature environment or deterioration of the durability of the rotating unit 1051.

A temperature sensor 1053 measures the temperature of the vibrator 1052. The temperature detection result is used to thermally correct the frequency of the voltages applied to the vibrator 1052. A position sensor 1056 detects a rotation position of the rotating unit 1051 by detecting, as an electric signal through a light receiving unit, reflected light of a light emission signal emitted from a light emitting unit to a pattern engraved on an optical scale attached to the rotating unit 1051. The driving circuit 1054 performs amplification and signal conversion such that the voltage generated by a driving signal generating circuit 1128 (which will be described below) can become a voltage that can drive the vibrator 1052.

An analog-to-digital converter (hereinafter referred to as an ADC) 1121 analog-to-digital converts the electrical signal detected by the position sensor 1056. A position calculating unit 1122 finds a rotation position of the rotating unit 1051 based on sensor information digitized by the ADC 1121. A target position setting unit 1123 sets a target rotation position in the panning direction based on a rotation instruction from the operation unit 211. A Proportional-Integral-Differential (PID) calculating unit 1124 performs PID control calculation based on a deviation between the target rotation position of the rotating unit 1051 set by the target position setting unit 1123 and the rotation position of the rotating unit 1051 obtained by the position calculating unit 1122. A conversion unit (first control unit, second control unit) 1127 converts a control amount calculated by the PID calculating unit 1124 into a phase difference and a frequency of the two-phase voltages. A limiting unit 1125 limits change amounts in the phase difference, voltage amplitude, and frequency of the two-phase voltages. The driving signal generating circuit 1128 generates a driving signal according to the phase difference, voltage amplitude, and frequency of the two-phase voltages determined by the conversion unit 1127. The driving signal is a rectangular wave signal. The voltage amplitude of the voltages applied to the vibrator 1052 changes according to the ratio (duty ratio) of the pulse width of the rectangular wave in one cycle of the driving signal. As the duty ratio increases, the voltage amplitude increases, and as the duty ratio decreases, the voltage amplitude decreases. The voltage amplitude may be changed by a method other than the pulse width modulation (PWM) method.

Relationship Between Driving Frequency of Vibrator 1052 and Driving Velocity of Rotating Unit 1051

Figure 5:
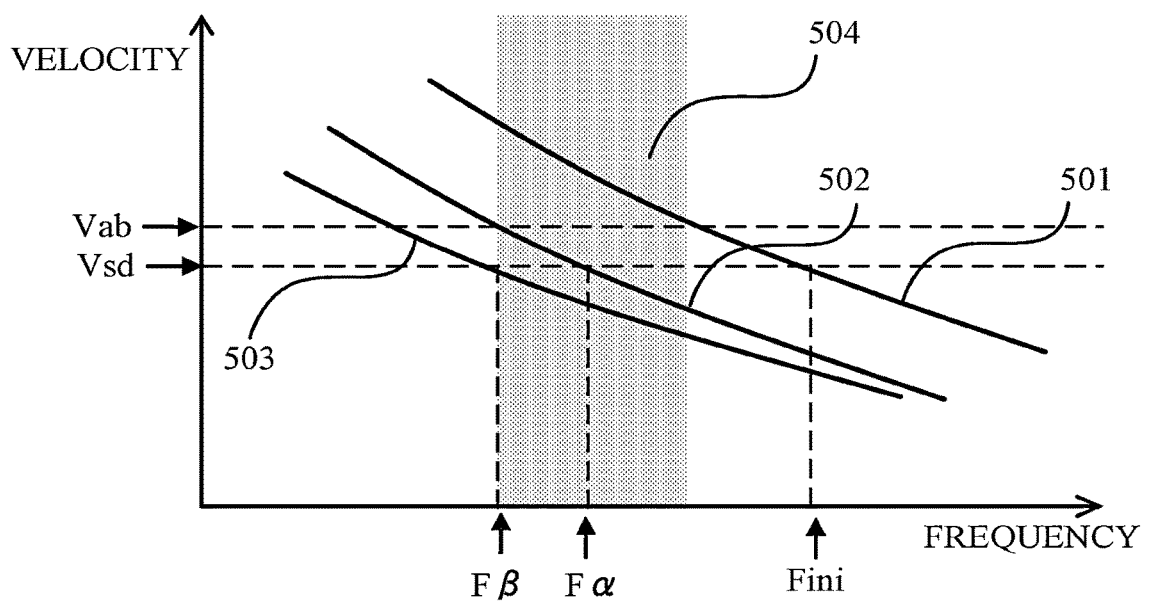
FIG. 5 illustrates a relationship between a driving frequency of the vibrator and a driving velocity of the rotating unit.

FIG. 5 illustrates a relationship (frequency-velocity (FV) characteristic) between the driving frequency of the vibrator 1052 and the driving velocity of the rotating unit 1051, illustrating temperature change in the FV characteristic and a prohibited frequency range. Reference numeral 501 denotes an FV curve at reference temperature tsd. Reference numeral 502 denotes an FV curve in a case where the temperature changes by $\Delta\alpha$ from the reference temperature tsd. A phase difference between the two-phase driving voltages in the FV curves 501 and 502 is 90°. Vsd denotes a reference velocity in a case where the vibrator 1052 is corrected thermally (based on the temperature).

A driving frequency Fp during phase difference control varies depending on the temperature and is expressed by the following expression (1).

$$Fp = Fini - k \cdot (tx - tsd) \quad (1)$$

where tx is temperature detected by the temperature sensor 1053, Fini is a starting frequency at which the driving velocity becomes the reference velocity Vsd in a case where the two-phase voltages with a phase difference of 90° are applied to the vibrator 1052 at the reference temperature tsd, and k is a temperature correction coefficient for the starting frequency Fini.

$F\alpha$ is a driving frequency in a case where the temperature changes from the reference temperature tsd by $\Delta\alpha$. $F\beta$ is a driving frequency in a case where the temperature changes from the reference temperature tsd by $\Delta\beta$.

Reference numeral 504 denotes a prohibited frequency range of the frequency of the voltages applied to the vibrator 1052. The prohibited frequency range 504 is a frequency range that may adversely affect an image and operation of the camera 101 due to mechanical vibration caused by the vibrator 1052 and electrical noise generated by the driving circuit 1054.

In a case where the temperature changes from the reference temperature tsd by $\Delta\alpha$, the driving frequency $F\alpha$ falls within the prohibited frequency range 504. In that case, the driving frequency is set to the driving frequency $F\beta$ that is outside the prohibited frequency range 504 and closest to the driving frequency $F\alpha$. If the driving frequency is set to the driving frequency $F\beta$ in a case where the temperature changes from the reference temperature tsd by $\Delta\beta$, a velocity Vab in a case where the phase difference between the two-phase voltages is 90° is higher than the reference velocity Vsd. In a case where position control of the rotating unit 1051 is made in this state, a change amount in the rotating unit 1051 becomes larger than expected, and proper control is unavailable. In the worst case, it becomes an uncontrollable (oscillation) state.

In a case where the thermally corrected driving frequency in the FV curve 502 falls within the prohibited frequency range 504, the voltage amplitude of the two-phase voltages is adjusted so that the driving velocity in a case where the phase difference is 90° becomes the reference velocity Vsd.

In a case where a voltage amplitude in a case where the vibrator 1052 is at the reference temperature tsd is Asd, a voltage amplitude $A\beta$ on the FV curve 503 is expressed by the following expression (2).

$$A\beta = (Vsd/Vab) \cdot Asd \quad (2)$$

In a case where the driving frequency thus falls within the prohibited frequency range 504 due to the temperature correction, it is necessary to simultaneously change the driving frequency and the voltage amplitude in order to accord the control performance of the rotating unit 1051 with the pre-correction performance. Since the driving frequency and voltage amplitude are changed simultaneously and discontinuously, unnecessary vibrations are generated in the vibrator 1052 due to changes in the FV characteristic, and uneven rotation or noise may occur in the rotating unit 1051. In a case where uneven rotation occurs during image recording, image blur may be captured in the rotating direction due to the influence of the uneven rotation. The above problem does not occur if no thermal correction of the driving frequency is made, but the change amount of the rotating unit 1051 becomes improper if the position control of the rotating unit 1051 is made. As a result, uneven rotation may occur because load fluctuations caused by the rotation position changes of the rotating unit 1051 cannot be suppressed, and a blurred image may be captured. A method for solving this problem will be described below.

Operation of Image Pickup Apparatus

Figure 6:
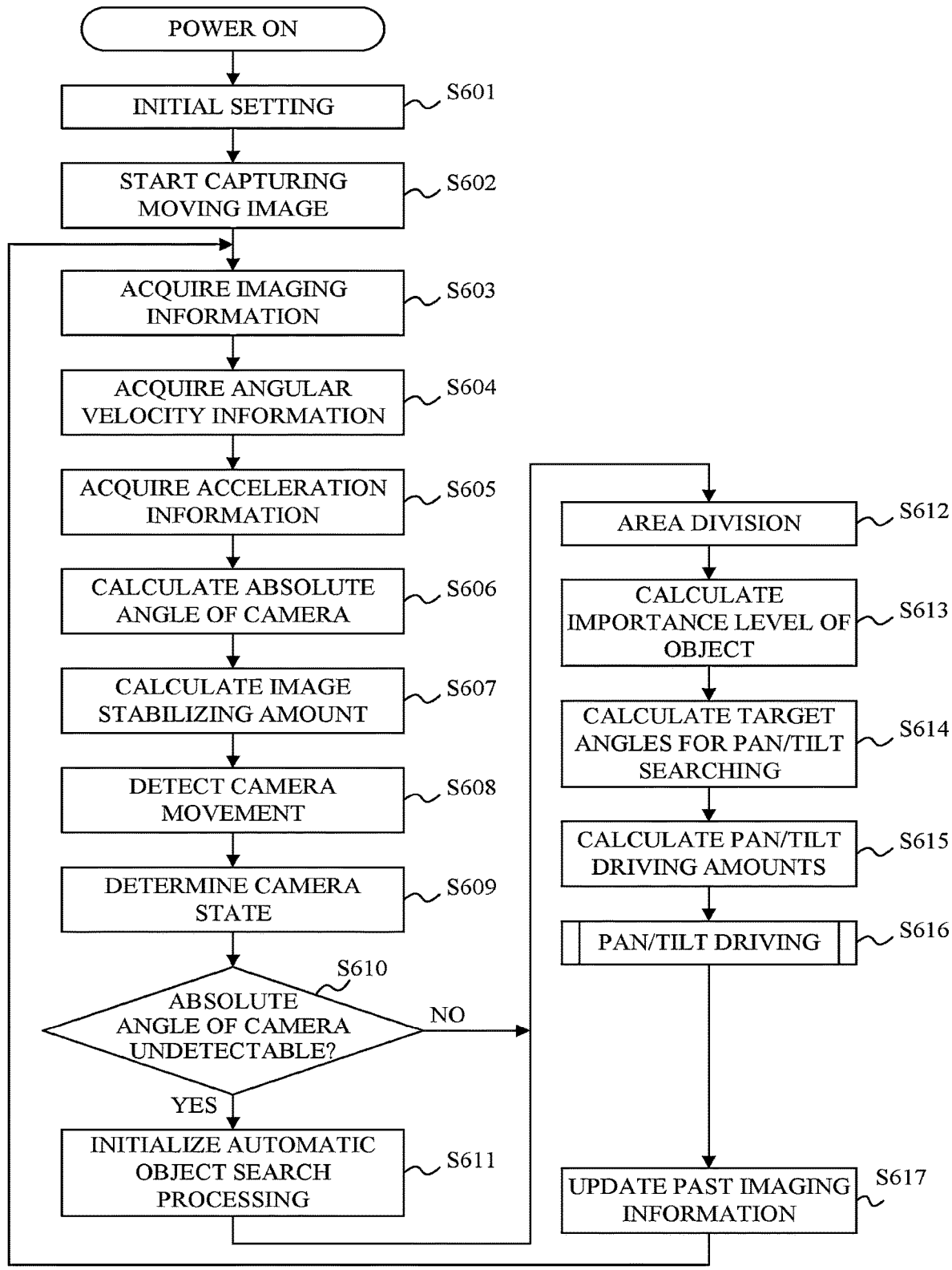
FIG. 6 is a flowchart for explaining one example of an operation of the image pickup apparatus.

FIG. 6 is a flowchart for explaining an example of the operation of the camera 101. The camera 101 has an automatic object searching function, which is started in a case where the camera 101 is powered on, and executes automatic object searching and automatic imaging.

In a case where the power button is operated in the operation unit 211, the control unit 212 performs various initial settings (imaging/automatic searching, etc.) in step S601. The initialization of the automatic searching performs processing such as initialization of an importance (or priority) level (or rating or point or score), which will be described below. In a case where the initial setting ends and image information from the image sensor can be acquired, the image processing unit 206 generates an image for object detection using a signal acquired from the imaging unit 205. An object such as a person or an object is detected using the generated image. In detecting the person, his face and body are detected. In the face detection processing, a pattern for determining the face of the person is previously determined, and a portion included in an image that matches the pattern can be detected as a face image of the person. Face credibility indicating the probability that the object is a face is also simultaneously calculated. The face credibility is calculated, for example, from the size of the face area in the image, the matching degree with the face pattern, and the like. As for object recognition, similarly, an object matching a pre-registered pattern can be recognized. There is also a method of extracting an object using a histogram of hue, chroma, etc. in an image. This method divides a distribution derived from the histogram of the hue, chroma, etc. into a plurality of sections regarding an object image captured within an imaging angle of view, and classifies the captured image for each section. For example, a histogram of a plurality of color components is created for the captured image and is divided according to the mountain-shaped distribution range, and the captured image is classified by an area belonging to a combination of the same section, and the image area of the object is recognized. By calculating an evaluation value for each image area of the recognized object, the image area of the object with the highest evaluation value can be determined as the main object area.

In step S602, the control unit 212 starts moving image capturing. In step S603, the control unit 212 acquires imaging information such as object detection information. In step S604, the control unit 212 acquires angular velocity information from the apparatus shake detecting unit 208. In step S605, the control unit 212 acquires acceleration information from the apparatus shake detecting unit 208. In step S606, the control unit 212 calculates an absolute angle of the camera from the angular velocity information and the acceleration information. In step S607, the control unit 212 calculates an image stabilizing amount for suppressing image blur that occurs in a case where the camera 101 is hand-held or wearable on the human body.

Since the angular velocity sensor 106 and the acceleration sensor 107 are mounted on the fixing unit 103, the angular velocity information and the acceleration information are information at the position of the fixing unit 103, and the absolute angle of the camera calculated based on the information is an absolute angle at the position of the fixing unit 103. In correcting rotational blur of the barrel 102 (blur of the image sensor), an image stabilizing amount is calculated using a correction angle based on the angular velocity information at the position of the fixing unit 103. The control unit 212 performs image stabilization by driving the tilt rotation unit 104 and the pan rotation unit 105 via the barrel rotation driving unit 112 based on the image stabilizing amount and by rotating the barrel 102.

Calculating Method of Absolute Angle of Camera and Image Stabilizing Amount

FIG. 7 explains a calculating method of the absolute angle of the camera and the image stabilizing amount. A description will now be given of a method for calculating the absolute angle of the camera. An absolute pitch angle calculating unit 701, an absolute yaw angle calculating unit 702, and an absolute roll angle calculating unit 703 calculate absolute angles in the pitch, yaw, and roll directions, respectively, using an output of the angular velocity sensor 106 and an output of the acceleration sensor 107. Thereby, the absolute angle of the camera at the positions of the angular velocity sensor 106 and the acceleration sensor 107, that is, the absolute angle of the camera at the position of the fixing unit 103 is calculated.

First, the absolute angles of the camera in the roll direction, pitch direction, and yawing direction (acceleration-calculated absolute roll angle, acceleration-calculated absolute pitch angle, and acceleration-calculated absolute yaw angle) are calculated based on a relationship between the outputs of the axes of the acceleration sensor 107. However, the tilt angle can be accurately calculated in a case where the camera 101 is stationary and is not affected by external acceleration, that is, in a case where gravitational acceleration is dominant in the acceleration detected by the acceleration sensor 107. The influence of acceleration (vibration acceleration) other than the gravitational acceleration increases during imaging while the camera 101 is moved, for example, while the photographer is holding the camera and walking, while the camera 101 is fixed and attached to part of the body, and while the camera 101 is attached to a vehicle such as a car or a motorcycle and captures an image. Therefore, it is difficult to calculate an accurate absolute angle of the camera. Even in a case where the absolute angle of the camera is estimated with the angular velocity sensor 106, the orientation angle can be estimated by integrating the output of the angular velocity sensor 106 but it is difficult to accurately calculate the absolute angle because an error caused by the integration is included.

Accordingly, a peculiar noise range of each of the angular velocity sensor 106 and the acceleration sensor 107 is removed, and the signals are combined by sensor fusion to calculate the absolute angle. More specifically, the absolute angles are calculated with a Kalman filter, a complementary filter, etc., and low-frequency noise that most affects the integration error of the angular velocity sensor 106 and high-frequency noise that most affects the calculation error caused by disturbance of the acceleration sensor 107 are eliminated, and the signals are combined. The sensor fusion enables an accurate absolute angle to be calculated while noise is removed.

Thus, the absolute pitch angle is calculated by the sensor fusion of the gyro-pitch angular velocity from the angular velocity sensor 106 and the acceleration-calculated absolute pitch angle. The absolute yaw angle is calculated by the sensor fusion of the gyro-yaw angular velocity from the angular velocity sensor 106 and the acceleration-calculated absolute yaw angle. The absolute roll angle is calculated by the sensor fusion of the gyro-roll angular velocity from the angular velocity sensor 106 and the acceleration-calculated absolute roll angle.

The absolute angle is calculated by the angular velocity sensor 106 in an axis for which the absolute angle of the camera cannot be calculated from the acceleration sensor 107 (such as a yaw rotation axis as a rotation axis around the Y-axis direction in a case where the Y-axis direction of FIG. 1B perfectly accords with the gravity direction). An absolute angle is calculated by the angular velocity integration during a period in which the absolute angle of the camera cannot be calculated, by starting with the last absolute angle at which the absolute angle of the camera is determined to be calculable due to changes in the camera angle.

A description will now be given of the calculating method of the image stabilizing amount. The image stabilization can be performed by driving the tilt rotation unit 104 and the pan rotation unit 105 based on the absolute angle of the camera calculated by the method described above. However, image stabilizing control based on the absolute angle of the camera can provide control for continuing to maintain the same orientation forever and thus the composition is not changed, for example, in a case where the photographer captures an image while moving, and image stabilizing control becomes unavailable beyond a movable end of each unit. Accordingly, image stabilizing control is performed for a high-frequency component without image stabilization for a low-frequency component. That is, the image stabilizing amount is calculated using the angular velocity sensor 106 in order to perform image stabilizing control for the high-frequency component without performing image stabilizing control for the low-frequency component.

The image stabilizing angle is calculated by integrating the output of the angular velocity sensor 106 after its DC component is cut with a high-pass filter (HPF) to convert it into an angular signal. A pan image-stabilizing angle calculating unit 705 calculates an image stabilizing angle in the panning direction (yawing direction) from the gyro-yaw angular velocity output from the angular velocity sensor 106. The image stabilization is performed in the panning direction by driving the pan rotation unit 105 based on the calculated image-stabilizing angle. As for the tilting direction, since the angular velocity sensor 106 is mounted on the fixing unit 103, the image stabilizing control in the tilting direction changes depending on the rotation angle of the pan rotation unit 105. In a case where the camera 101 is in the normal position (the X-axis direction in FIG. 8A is always orthogonal to the optical axis), the pitch image-stabilizing angle calculated by a pitch image-stabilizing angle calculating unit 706 is directly used as the tilt image-stabilizing angle. In a case where the camera 101 is rotated by 90 degrees from the normal position (the Z-axis direction in FIG. 8B is always orthogonal to the optical axis), the roll image-stabilizing angle calculated by a roll image-stabilizing angle calculating unit 707 is directly calculated as the tilt image-stabilizing angle. The tilt image-stabilizing angle corresponding to the pan rotation angle is calculated using the following expression (3).

$$\theta tl = \theta pi \times \cos\theta ap + \theta ri \times \sin\theta ap \quad (3)$$

where θtl is a tilt image-stabilizing angle, θpi is a pitch image-stabilizing angle, θri is a roll image-stabilizing angle, and θap is a pan rotation angle.

As described above, a tilt image-stabilizing angle calculating unit 704 calculates the tilt image-stabilizing angle according to the pan rotation angle.

The tilt image-stabilizing angle can be calculated by converting the pitch angular velocity and roll angular velocity from the angular velocity sensor 106 and the tilt angular velocity calculated from the pan rotation angle (current position 708 of the pan rotation unit 105).

By the method described above, the pan image-stabilizing angle and the tilt image-stabilizing angle can be calculated, and the tilt rotation unit 104 and the pan rotation unit 105 are driven according to each image-stabilizing angle (image stabilizing amount) for image stabilization.

The absolute angle of the barrel 102 can be calculated from the absolute angle of the camera and the rotation angles of the tilt rotation unit 104 and the pan rotation unit 105. More specifically, by subtracting the rotation angle of the pan rotation unit 105 from the absolute yaw angle calculated from the absolute yaw angle calculating unit 702, a camera angle based on the optical axis in the yawing direction (absolute yaw angle of the barrel 102) can be calculated.

The rotation angles of the barrel 102 in the pitch direction and roll direction converted into the position of the fixing unit 103 can be calculated from the rotation angles of the pan rotation unit 105 and the tilt rotation unit 104. A camera angle based on the optical axis in the pitch direction (absolute pitch angle of the barrel 102) is calculated by subtracting the rotation angle of the barrel 102 in the pitch direction from the absolute pitch angle calculated from the absolute pitch angle calculating unit 701. A camera angle based on the optical axis in the roll direction (absolute roll angle of the barrel 102) is calculated by subtracting the rotation angle of the barrel 102 in the roll direction from the absolute roll angle calculated from the absolute roll angle calculating unit 703.

As described above, once the absolute angle of the camera can be acquired based on the optical axis, which angular direction the barrel 102 faces can be determined, for example, based on the angle in a case where the camera is started.

After the absolute angle of the camera and the image stabilizing amount are calculated, the control unit 212 detects camera movement in step S608. More specifically, the control unit 212 acquires information as to whether the camera 101 has significantly moved from the apparatus movement detecting unit 209. The control unit 212 may use information from an external device that can acquire GPS position information to determine whether the camera 101 has significantly moved.

In step S609, the control unit 212 determines the camera state. More specifically, the control unit 212 determines what kind of vibration/motion state the camera 101 is currently in based on the camera angle, camera moving amount, and the like. For example, in a case where the camera 101 is attached to a car and captures an image, object information such as surrounding landscapes significantly changes due to movement and thus the control unit 212 determines whether the camera 101 is in a "moving state on a vehicle" in which the camera 101 is mounted on a car or the like and is moving at a high speed. The determination result can be used for automatic object searching, which will be described below. The control unit 212 determines, based on a change in the camera angle, whether the camera 101 is in an "imaging state in the placement" in which there is almost no shake angle of the camera. It can be considered that the camera 101 has no angular change in the "imaging state in the placement," object search for imaging in the placement can be performed. In a case where the camera has a relatively large angular change, the control unit 212 determines that the camera is in a "handheld state" and object searching for the handheld state can be performed.

In step S610, the control unit 212 determines whether the absolute angle of the camera is undetectable. The state in which the absolute angle of the camera is undetectable is, for example, a case where the camera receives such a great impact that a problem occurs in the calculation of the absolute angle of the camera using the output of the acceleration sensor 107, or a case where the camera has such a high angular velocity that it exceeds the detectable range of the angular velocity sensor 106. In a case where it is determined that the absolute angle of the camera is undetectable, the flow proceeds to step S611; otherwise, the flow proceeds to step S612. In step S611, the control unit 212 initializes automatic object search processing.

In step S612, the control unit 212 performs area division based on the absolute angle of the camera at the initial setting in step S601 or in the initialization of the automatic object search processing in step S611. In addition, the control unit 212 divides the image currently acquired by the camera 101 into blocks based on the area division.

Figure 9A:
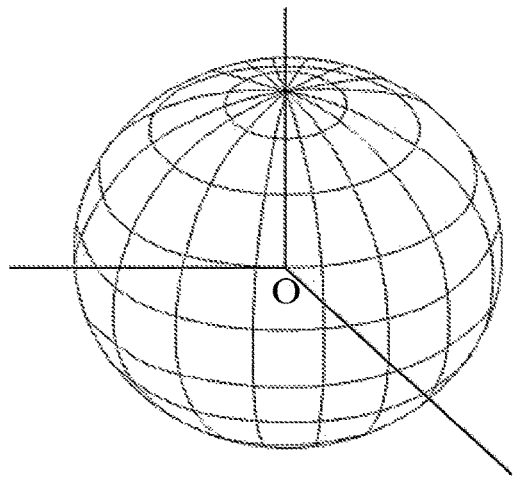
FIGS. 9A to 9D explain area division.
Figure 9B:
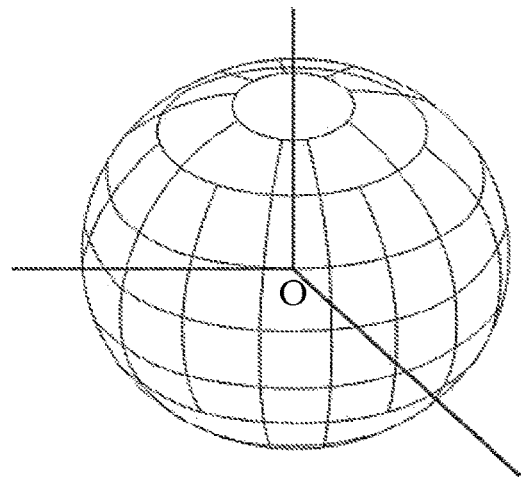

The area division will be described below with reference to FIGS. 9A to 9D. FIGS. 9A to 9D explain the area division. As illustrated in FIG. 9A, the area division is performed over the whole circumference around the position of the camera 101 represented by an origin O as the center. In FIG. 9A, the area is divided every 22.5 degrees in each of the tilting direction and the panning direction. In the case where the area is divided as illustrated in FIG. 9A, as the angle in the tilting direction becomes higher from 0 degrees, the circumference in the horizontal direction becomes smaller and the area becomes smaller. Thus, as illustrated in FIG. 9B, in a case where the tilt angle is 45 degrees or more, the horizontal area is set to have an angle larger than 22.5 degrees.

Figure 9C:
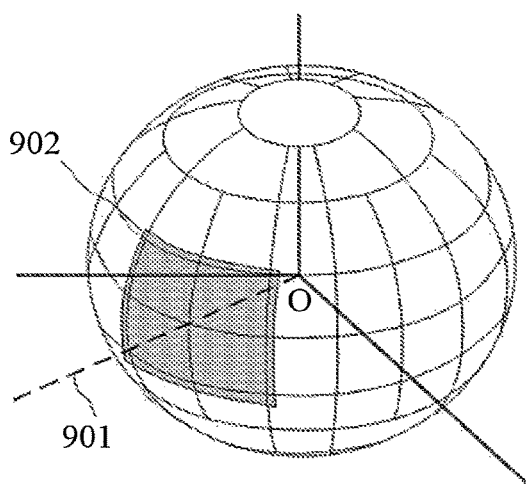
Figure 9D:
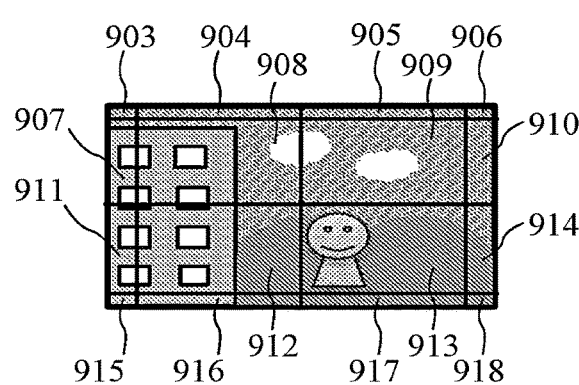

FIG. 9C illustrates an example of area division within a captured angle of view. A direction 901 is a direction of the camera 101 during initialization, and area division is performed based on the direction 901. Reference numeral 902 denotes a view angle area of the captured image, and FIG. 9D illustrates an example of an image at that time. The image captured at this angle of view is divided as illustrated by reference numerals 903 to 918 in FIG. 9D based on the area division.

FIGS. 10A to 10C explain area division within a captured image, which is area division within an imaging angle of view where the panning direction of the camera 101 is the direction 901. FIG. 10A illustrates an area based on the absolute angle of the camera 101 during initialization of automatic object searching, in which reference numeral 1001 denotes the imaging angle of view and reference numeral 1002 denotes a center of the angle of view where the tilt angle is 0 degrees. FIG. 10B illustrates the captured image at that time. In FIG. 10A, reference numeral 1003 denotes an imaging angle of view, and reference numeral 1004 denotes a center of the angle of view where the tilt angle is 55 degrees. FIG. 10C illustrates the captured image at that time.

In a case where the tilt angle is 0 degrees, an angular range in the lateral (horizontal) direction does not significantly change, so a difference in area size is small, but in a case where the tilt angle is 55 degrees, an angular range in the lateral direction will significantly change depending on the angle. Therefore, in a case where the tilt angle is 45 degrees or higher, the area in the horizontal direction is set to have an angle larger than 22.5 degrees. Thereby, the area is prevented from becoming too small as the tilt angle increases.

Figure 11B:
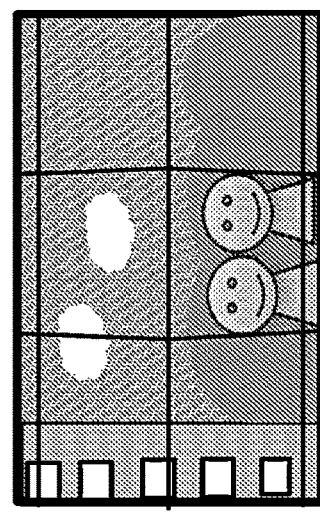
FIGS. 11A and 11B explain area division in a captured image.
Figure 11A:
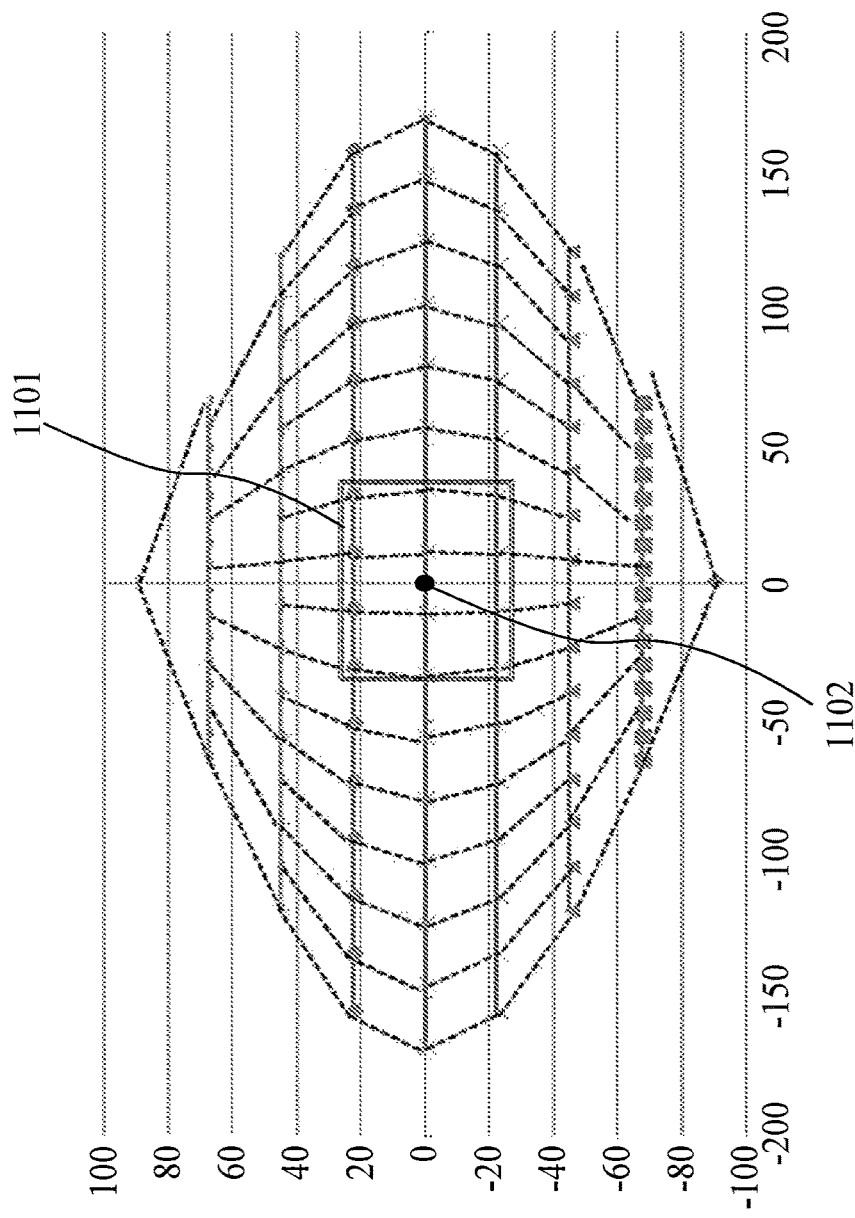

FIGS. 11A and 11B explain area division in a captured image. FIG. 11A illustrates an area in a case where the camera 101 is rotated by 11.25 degrees in the panning direction from the initial position, reference numeral 1101 denotes an imaging angle of view and reference numeral 1102 denotes a center of the angle of view where the tilt angle is 0 degrees. FIG. 11B illustrates a captured image at that time. As illustrated in FIG. 11A, an area is set around 11.25 degrees in the horizontal direction as a center.

The area within the above imaging angle of view is calculated by the following expressions (4) and (5), all the areas existing within the angle of view are calculated, and the area is divided within the image:

$$\theta ay = \theta y + \theta y' \quad (4)$$

$$\theta ax = \theta x' \cdot \cos \theta ay \quad (5)$$

where $\theta y$ is a tilt angle based on the initial position of the camera 101, $\theta x'$ is an angle from the pan angle position (horizontal center of the image) to an area division angle, $\theta y'$ is an angle from the tilt angle position (vertical center of the image) to an area division angle, $\theta ax$ is a length of the horizontal angle from the horizontal center to the horizontal area division angle in the image, and $\theta ay$ is a length of the vertical angle from the vertical center to the vertical area division angle in the image. The initial position of the camera 101 is set to 0 degrees.

The area division angle is set every 22.5 degrees, but the horizontal area division is set to 45 degrees in a range of 45 degrees to 67.5 degrees in the vertical direction. No horizontal division is made in a range of 67.5 degrees to 90 degrees in the vertical direction and the area is set to a single area.

In step S613, the control unit 212 calculates the importance level. As illustrated in FIG. 9D, the importance level is calculated for each area based on object information and the like in the acquired image. However, in a case where the captured area is small relative to the angle of view (for example, in a case where the area size is set to 100%, a captured area in the image is 50% or less), no importance level is determined or updated. The importance level is set according to various conditions for each set area.

Importance Level Setting According to Personal Information

The importance level is set according to personal information in each area within an angle of view. A face detecting method includes, for example, a method that uses knowledge about faces (skin color information, parts information such as eyes, nose, and mouth) and a method that constitutes an identifier unit for face detection using a learning algorithm represented by a neural network. It is general to perform face detection by combining a plurality of face detection methods in order to improve detection accuracy. By performing the face detection, the size and orientation of a face, and the credibility representing the certainty of a face, etc., are calculated. There is also a known method of detecting a facial expression from detection information for each organ of the face, and using this method can detect the opening degree of the eyes and the smiling degree. More specifically, this method acquires feature amounts necessary to detect the facial expression based on the contours of the facial organs (eyes, nose, mouth, etc.) and positions of inner and outer corners of eyes, nose wings, corners of a mouth, lips, and the like. The acquiring method of the feature amounts includes a template matching method using templates of each facial component, a learning algorithm method using a large number of sample images of facial components, and the like. Based on the detected feature amounts, this method can detect facial expressions such as smiling degree, blink, wink, and facial expression estimation (such as joy, surprise, anger, sadness and seriousness).

Personal face data are previously registered, and personal face authentication can be performed to detect whether the detected face is a specific individual. Whether or not state matches a target previously registered in a database or the matching degree is determined. The object area and feature information for identifying the object to be authenticated are extracted based on the image data of the detected object, and the extracted feature information and the feature information on the image of the object previously registered in the database are compared with each other. Based on an authentication evaluation value that represents the similarity degree obtained by the comparison, authentication is made as to which registered object the object to be authenticated is or whether there is no corresponding registered object. For example, in a case where the authentication evaluation value is equal to or higher than a predetermined threshold, it may be determined that the object to be authenticated is a target registered in the database.

Kr is a value of the level set by face credibility (for example, which increases from low credibility to high credibility). The credibility is determined by the size and orientation of the face, the certainty of the face, and the like. Ka is a value of the level set by personal face authentication information and is set for each face based on the importance level for each registered personal face (where the importance level is previously registered) and past imaging information, which will be described below. Ks is a value of the level set according to facial expression and is rated for each face based on a level corresponding to preset facial expression (for example, smile, joy, surprise, and the like are given a high level, whereas anger, sadness, seriousness, blink, and the like are given a low level). The level may be variable according to the facial expression degree for each facial expression, such as the smiling degree in the case of a smile.

From the values Kr, Ka, and Ks, a level Flvl corresponding to the personal face expression is expressed by the following expression (6).

$$Flvl = Kr \cdot Ka \cdot Ks \quad (6)$$

Figure 12:
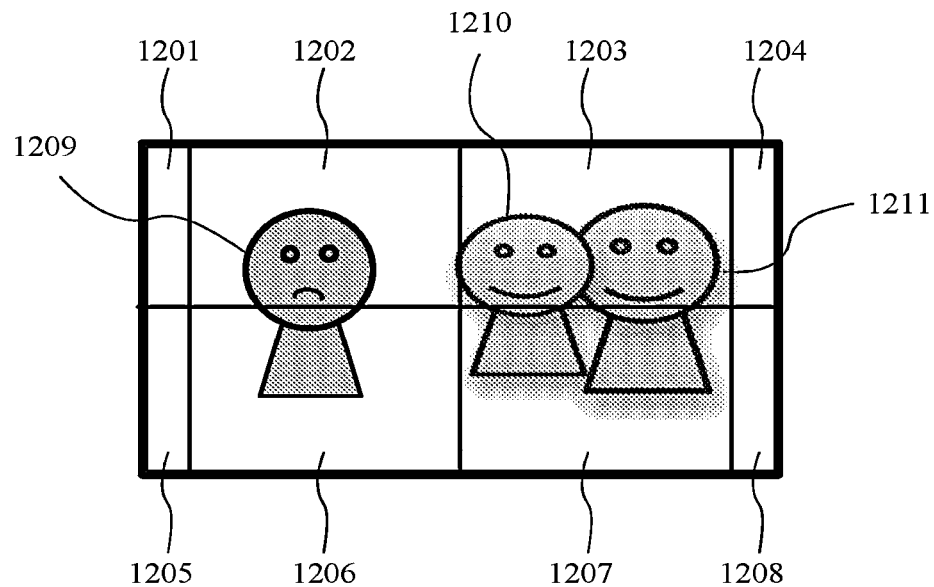
FIG. 12 explains person detection for each area in a captured image.

Referring now to FIG. 12, a description will be given of the importance level setting according to personal information. FIG. 12 explains person detection for each area in a captured image. For a small area illustrated in an image, such as areas 1201, 1204, 1205, and 1208, it is not determined as not being searched. A description will now be given of a case where three persons (1209, 1210, 1211) are captured within an angle of view as an example. Assume that the person 1209 is an object that has not yet been registered as personal face authentication and has no smiling face. The person 1210 is an object that has not yet been registered as personal face authentication and has a smiling face. The person 1211 is an object that has been registered as personal face authentication and has a smiling face.

Since the person 1209 is captured in areas 1202 and 1206, levels of both areas are set according to the personal information on the person 1209. The value (gain) Ka is 1 because the person 1209 has not yet been registered as individual authentication when the registered individual authentication information is referred to, the value (gain) Ks is 1 because the person 1209 is not smiling, and thus the level Flvl of the person 1209 is Kr.

Since the persons 1210 and 1211 are captured in areas 1203 and 1207, importance levels are set to both areas according to the personal information on the persons 1210 and 1211. The person 1210 has a value Ka of 1 because it has not yet been registered as personal face authentication, and a value Ks of 1 or higher because the object has the smiling face. Since the person 1211 has been registered as personal face authentication, the value Ka is 1 or higher, and since the object has a smiling face, the value Ks is 1 or higher. In a case where the persons 1209, 1210, and 1211 have the same face credibility, they are prioritized in the order of the persons 1211, 1210, and 1209.

The level is set according to the facial ratio in the image. The calculated importance level is set as it is for areas having large facial ratios, and the importance level is changed according to the facial ratio for areas having small facial ratios. For example, in a case where the facial ratio of a person between the areas 1203 and 1207 is 8:2, the importance level is set to 10:2.5.

As described above, the importance level is set for each area based on personal face information.

Importance Level Setting According to Object Recognition Information

In a case where a previously registered object is detected, the importance level is set according to object recognition information. For example, general object category recognition such as "dog" and "cat" is performed, and the importance level is set according to object recognition and the matching degree with a previously registered object image. The object recognition includes a method that constitutes an identifier unit for "dog", "cat", etc. using a learning algorithm represented by a neural network.

Figure 13:
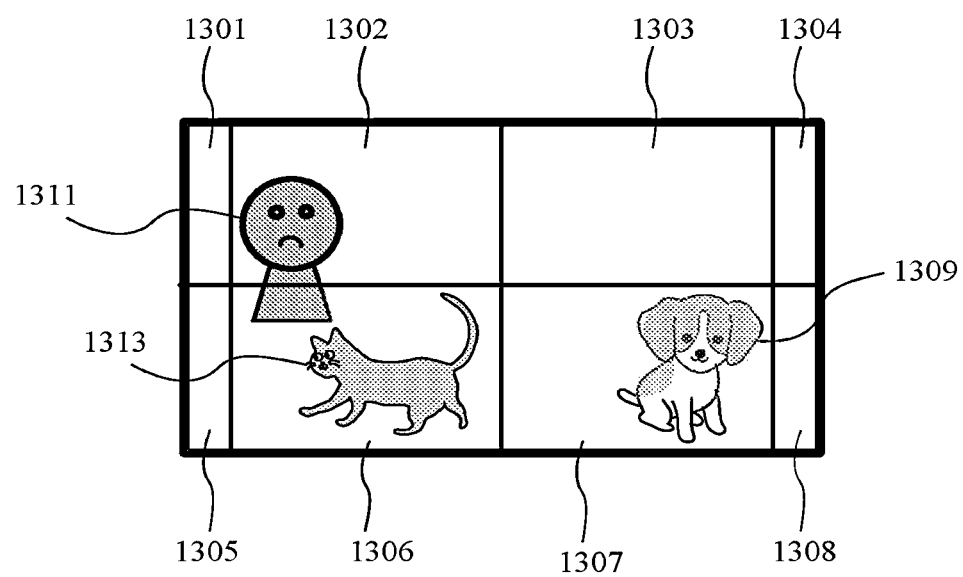
FIG. 13 explains object detection for each area within a captured image.

Referring now to FIG. 13, a description will be given of the importance level setting according to previously registered object recognition information. FIG. 13 explains object detection for each area in a captured image. A description will now be given of a case where three objects (1309, 1311, 1313) are captured within an angle of view as an example. The objects 1309 and 1313 are determined to be a dog and a cat, respectively, by the object recognition. The object 1311 is a person, and the person is determined by the importance level setting according to personal information and thus is not an object for the purpose of the importance level setting according to the object recognition information. Assume that the level in a case where a "dog" is recognized and the level in a case where a "cat" is recognized are registered respectively. For example, in a case where the "dog" is set as an important object and the "cat" is not set as an important object, the area 1307 where the "dog" is detected has a higher importance level than that of the area 1306 where the "cat" is detected.

The importance level may be changed according to the credibility of object recognition. For example, the level is set according to the ratio of the object being imaged. The calculated importance level is set as it is for an area having the largest object ratio, and the importance level is changed according to the object ratio for an area having a small object ratio.

Importance Level Setting According to Scene

By analyzing image data, a "blue sky scene," a "natural green scene," a "evening view," and the like are determined, and a level is set based on the scene determination information. In the scene determination regarding the sky, the tilt information on the camera 101 can be obtained from the absolute angle information on the camera 101 and "blue sky scene," "evening view," and the like can be determined using an image in an area above a direction perpendicular to the gravity direction the like.

First, 12-bit RAW data of one captured frame is divided into n×m area blocks (where n and m are integers), and an average value of the R, G, and B pixels in each divided area is calculated. White balance correction processing, gamma correction processing, and provisional development processing by color conversion matrix processing are performed for the R, G, and B average values of each block.

The "blue sky scene" is determined by calculating the ratio of blue sky blocks in the upper area in an image.

Determination of whether or not a block is a blue sky block is made by defining a blue sky determination area in the UV color space and by counting the number of blocks belonging to that area. The "evening view" determination is made by calculating a ratio of evening view blocks in the upper area in an image. Determination of whether or not a block is an evening view block is made by defining an evening view determination area in the UV color space and counting the number of blocks belonging to that area. Determination of the "natural green scene" is made by detecting a ratio of natural green blocks to all blocks in an image. A determination as to whether or not a block is a natural green block is made by defining a natural green determination area in the UV color space and by counting the number of blocks belonging to that area.

Figure 14:
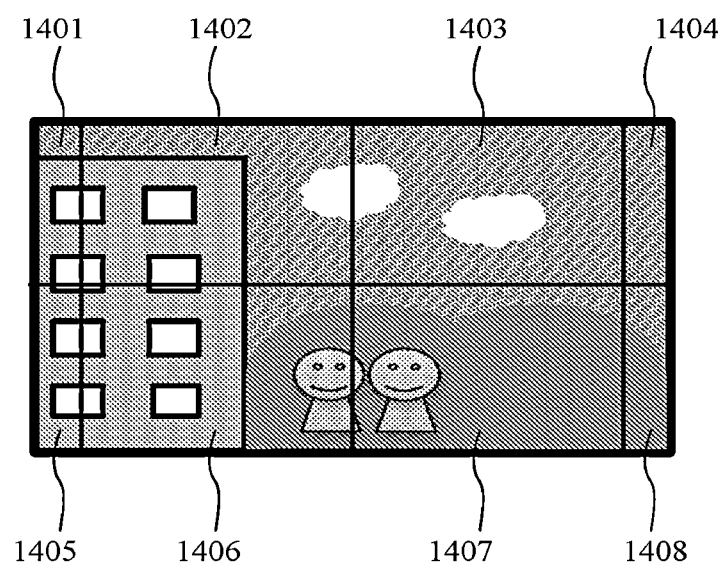
FIG. 14 explains scene detection for each area in a captured image.

Referring now to FIG. 14, a description will be given of importance level setting according to scene detection information. FIG. 14 explains scene detection for each area in a captured image. In FIG. 14, the blue sky is captured in the upper right area of the image, a building is captured in the left area of the image, and natural green is illustrated in the lower right area of the image. The "blue sky scene" and the "natural green scene" are detected by scene determination in the image, and the level of an area 1403 is set according to the blue sky area recognition, and the level of an area 1407 is set according to the natural green area recognition. An area 1402 has a blue sky area of about 40% of the entire area, and is given 40% of the level set according to the blue sky area recognition. An area 1406 has a natural green area of about 30% of the entire area, is given 30% of the level set according to the natural green area recognition.

Although the scene determination method based on the color space information has been described above, there is also a method for determining a scene based on a luminance value, which will be described with "evening view" determination as an example. In a case where the histogram of the entire image has a distribution of extremely high luminance levels and extremely low luminance levels, the image is determined as a night scene. Alternatively, a point light source may be determined by contrast evaluation based on a high-frequency component of a luminance signal of an image, and the "night scene" may be determined based on the luminance distribution and the point light source detection result.

Importance levels for the "blue sky scene," the "evening view," the "natural green scene," and the "night scene" are registered respectively, and the importance level is set according to the scene for each area and the registered importance level.

Importance Level Setting According to Sound Information

Figure 15:
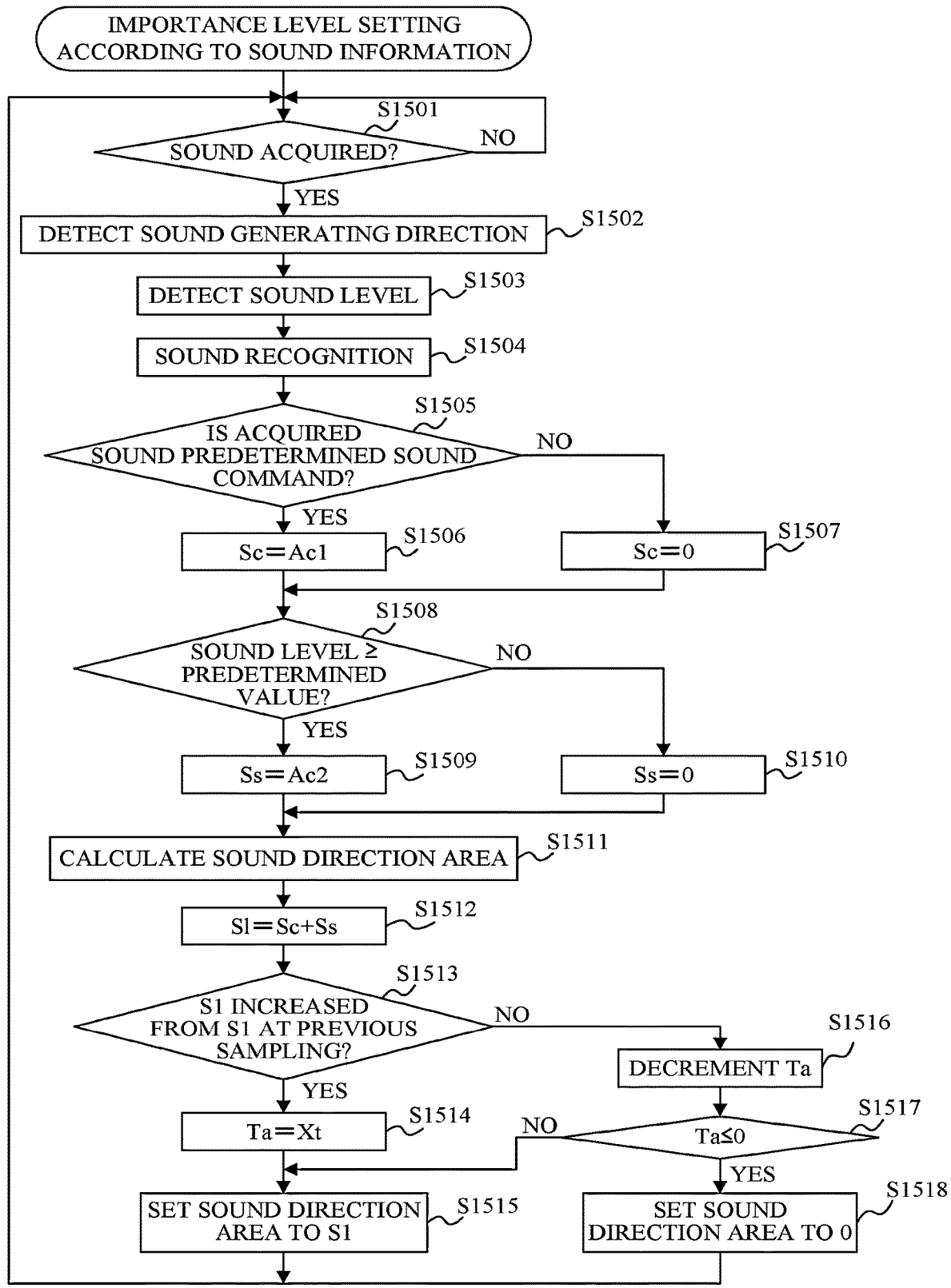
FIG. 15 is a flowchart for explaining sound detection.

By analyzing sound information data, a "sound direction", a "sound level", "sound recognition", and the like are determined, and the importance level is set based on the sound information. Referring now to FIG. 15, a description will be given of importance level setting according to sound information. FIG. 15 is a flowchart for explaining sound detection.

In step S1501, a sound acquiring unit included in the control unit 212 determines whether or not the sound generated outside has been acquired. In a case where it is determined that the sound has been acquired, the flow proceeds to step S1502; otherwise, this step is repeated.

In step S1502, a sound direction detecting unit included in the control unit 212 detects the direction of the acquired sound. In step S1503, the sound level is detected. In step S1504, a sound recognition unit included in the control unit 212 recognizes the acquired sound. In step S1505, it is determined whether the acquired sound is a predetermined sound command for sound recognition. In a case where it is determined to be the sound command, the flow proceeds to step S1506; otherwise, the flow proceeds to step S1507. In step S1506, sound recognition level Sc of the acquired sound is set to Ac1. In step S1507, the sound recognition level Sc of the acquired sound is set to zero.

In step S1508, it is determined whether the detected sound level is equal to or higher than a predetermined value. In a case where it is determined to be equal to or higher than the predetermined value, the flow proceeds to step S1509; otherwise, the flow proceeds to step S1510. In step S1509, sound level Ss is set to Ac2. In step S1510, the sound level Ss is set to zero.

In step S1511, a sound direction area is calculated from the sound generating direction detected in step S1502. For example, considering a sound direction recognition error, the sound direction area is set to an entire range of ±45 degrees from the determined direction angle. In step S1512, the sound recognition level Sc and the sound level Ss are added to calculate total sound level Sl. In step S1513, it is determined whether or not the total sound level Sl has increased from the total sound level Sl at the previous sampling. In a case where it is determined that the value has increased, the flow proceeds to step S1514; otherwise, the flow proceeds to step S1516. In step S1514, time count Xt is set to predetermined time Ta. In step S1515, the level Sl is set to the sound direction area calculated in step S1511. In step S1516, the predetermined time Ta is decremented. In step S1517, it is determined whether the predetermined time Ta is 0 or less. In a case where it is determined to be 0 or less (in a case where the predetermined time Ta has passed since the level Sl changed to increase), the flow proceeds to step S1518; otherwise, the flow proceeds to step S1516. In step S1518, 0 is set in the sound direction area calculated in step S1511.

Importance Level Setting According to Image Motion Information

It is determined whether or not a moving object exists in each area divided as illustrated in FIGS. 9A to 9D, and the importance level is set according to the image motion information.

Difference detection between frames and motion vector detection between frames are performed for each area. The motion vector detecting method includes a method of calculating an image motion amount from relative shift information on an image by dividing the image into a plurality of areas, and by comparing a previously stored image of the last frame (one frame before) with the current image (two consecutive images).

Here, the angle of the barrel 102 (in the optical axis direction on the image plane) is known from a difference between the absolute angle of the camera and the rotation positions of the tilt rotation unit 104 and the pan rotation unit 105. Therefore, the motion vector value of the image blur caused by the influence of the camera angle change can be detectable from the difference in the angle of the barrel 102 between frames. FIGS. 16A to 16C explain motion detection in a captured image. As illustrated in FIG. 16A, moving pixels between frames are detected in further divided areas in each area, and frequency distribution processing is performed with a vector signal obtained by subtracting the motion vector value due to the influence of camera angle change from the detected moving pixels. In a case where vector detection is difficult due to low contrast or the like, the vector information on the undetectable blocks is not reflected on the frequency distribution processing. FIG. 16B illustrates a frequency distribution example in a certain frame in a case where no moving object exists in a certain area. Since a threshold 1602 is a vector range with small vector values and almost no movement, the vector information within the threshold 1602 is not used. In a case where a moving amount other than the threshold 1602 exceeds a threshold 1603, it is determined that the moving object exists in the area. Since the moving amount does not exceed the threshold 1603 in FIG. 16B, it is determined that there is no moving object. FIG. 16C illustrates a frequency distribution example in a frame in which a moving object exists in an area. Since a vector moving amount outside the threshold 1602 exceeds the threshold 1603, it is determined that a moving object exists in this area. In a case where it is determined that the moving object continuously exists for the past several frames, the importance level corresponding to the moving object existing is set.

Importance Level Setting According to Past Imaging Information

The importance level is set based on past imaging information. In a case where the camera 101 detects an automatic imaging trigger from the image information being searched in the automatic object searching, automatic imaging is performed. The automatic imaging trigger may be, for example, the detection of facial expressions such as a smile of a person, or the magnitude of the final importance level. The photographer may manually capture an image using a release switch SW or the like provided on the camera 101. In a case where the camera 101 captures an image, past imaging information is stored and managed.

First, the level setting according to the past imaging information for each area will be explained. As illustrated in FIGS. 9A to 9D, in each divided area, the number of captured images in each area is stored and managed. FIG. 17 explains the management of the number of captured images for each area. The importance level for each area is set from the past information for each area illustrated in FIG. 17. "Now to T1 hours" indicates the number of captured images from the present to T1 hours ago, and a weighting factor for this period is set to 1, for example. "T1 hours to T2 hours" indicates the number of captured images from T1 hours ago to T2 hours ago, and a weighting factor for this period is set to 0.8, for example. "T2 hours to T3 hours" indicates the number of captured images from T2 hours ago to T3 hours ago, and a weighting factor for this period is set to 0.5, for example. "T3 hours to T4 hours" indicates the number of captured images from T3 hours ago to T4 hours ago, and a weighting factor for this period is set to 0.2, for example. The weighted total number of captured images is calculated for each area by multiplying each weighting factor by the number of captured images and by adding the calculation results at each time. The weighted total number of captured images for Area1 is 0.4 (=0×1+0×0.8+0×0.5+2×0.2), and the weighted total number of captured images for Area3 is 7.2 (=3×1+4×0.8+2×0.5+0×0.2). The level is set according to the past imaging information for each area by multiplying the weighted total number of captured images for each area by a level coefficient, which is a negative value and set so that the importance level decreases as the number of captured images increases. The past imaging information is also fed back to the "IMPORTANCE LEVEL SETTING ACCORDING TO PERSONAL INFORMATION," the "IMPORTANCE LEVEL SETTING ACCORDING TO OBJECT RECOGNITION INFORMATION," the "IMPORTANCE LEVEL SETTING ACCORDING TO SCENE," and the like and also affects each level.

FIG. 18 explains the management of the number of captured images for each registered object that has received personal authentication, and is a table that manages the past imaging information for feeding back to the "IMPORTANCE LEVEL SETTING ACCORDING TO PERSONAL INFORMATION." The number of past captured images for each of personally registered objects (Asan, Bsan, Csan, Dsan, . . . ) is stored and managed. As in the method described with reference to FIG. 14, a weighting factor is set for each time, and the total number of captured images is calculated for each registered object. By adding the result obtained by multiplying the total number of captured images by a level coefficient for the level setting to the value Ka, the past imaging information is fed back to the "IMPORTANCE LEVEL SETTING ACCORDING TO PERSONAL INFORMATION." The level coefficient is a negative value, and the level decreases as the number of captured images increases. The value Ka is set so as not to become 0 or less.

FIG. 19 explains the management of the number of captured images for each registered object that has been recognized as an object, and is a table for managing the past imaging information for feeding back to the "IMPORTANCE LEVEL SETTING ACCORDING TO OBJECT RECOGNITION INFORMATION." The number of past captured images for each registered object (such as a dog and a cat) is stored and managed. As in the method described with reference to FIG. 14, a weighting factor is set for each time, and the total number of captured images is calculated for each registered object. By adding the result obtained by multiplying the total number of captured images by a level coefficient for the level setting to the level according to each object, the past imaging information is fed back to the "IMPORTANCE LEVEL SETTING ACCORDING TO OBJECT RECOGNITION INFORMATION." The coefficient is a negative value, and the level decreases as the number of captured images increases. The importance level corresponding to each object is set so as not to become 0 or less.

FIG. 20 explains the management of the number of captured images for each scene, and is a table for managing the past imaging information for feeding back to the "IMPORTANCE LEVEL SETTING ACCORDING TO SCENE." The number of past captured images for each scene (blue sky, evening view, natural green, night view, etc.) is stored and managed. As in the method described with reference to FIG. 14, a weighting factor is set for each time, and the total number of captured images is calculated for each registered object. By adding the result obtained by multiplying the total number of captured images by a level coefficient for the level setting to the level according to each scene, the past imaging information is fed back to the "IMPORTANCE LEVEL SETTING ACCORDING TO SCENE." The coefficient is a negative value, and the level decreases as the number of captured images increases. The importance level according to each scene is set so as not to become 0 or less.

Importance Level Setting According to Unsearched Time

Figure 21:
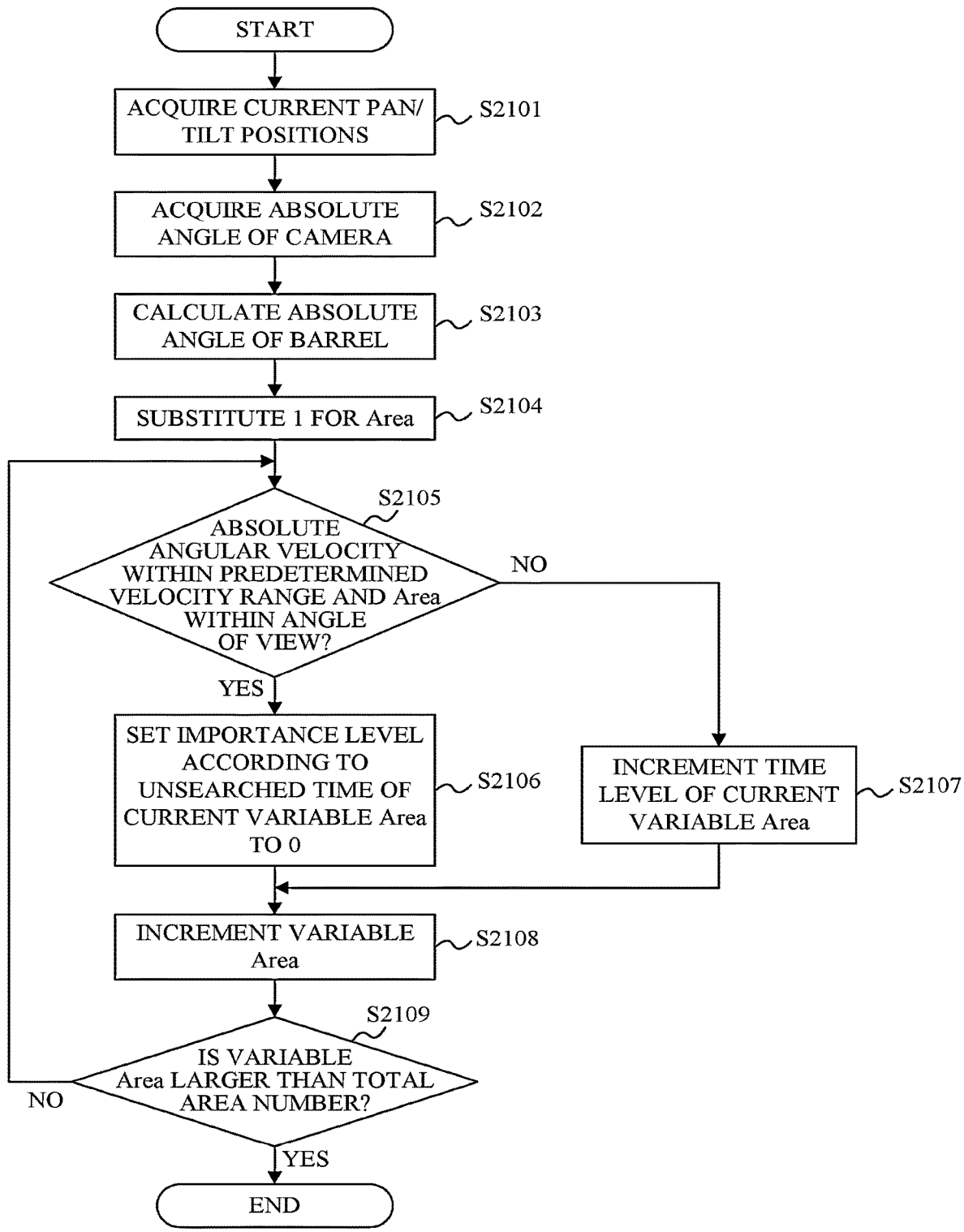
FIG. 21 is a flowchart for explaining calculation based on unsearched time.

As illustrated in FIGS. 9A to 9D, the importance level is set according to the elapsed time after the last search at each divided area position. FIG. 21 is a flowchart for explaining calculation based on the elapsed time after the last search. In step S2101, the current pan/tilt positions are acquired. In step S2102, the absolute angle of the camera is calculated in the manner described with reference to FIGS. 9A to 9D. In step S2103, the absolute angle of the barrel 102 is calculated from the pan/tilt positions acquired in step S2101 and the absolute angle of the camera acquired in step S2102.

In step S2104, 1 is substituted for Area, which is a variable for loop operation. In step S2105, it is determined whether the absolute angular velocity calculated by differentiating the absolute angle of the barrel 102 falls within a predetermined velocity range and the variable Area falls within the angle of view. Here, the predetermined velocity range is a velocity range in which the object can be detected at the absolute angular velocity (angular velocity range within a predetermined value of delay time until the object is detected from the image while the imaging delay and the detection time delay are considered). In a case where it is determined that the absolute angular velocity is within the predetermined velocity range and the variable Area is within the angle of view, the flow proceeds to step S2106. Otherwise, the flow proceeds to step S2107. In step S2106, the importance level according to the unsearched time of the current variable Area is set to zero. In step S2107, the time level of the current variable Area is incremented. In step S2108, the variable Area is incremented. In step S2109, it is determined whether the variable Area is larger than the number of total areas. In a case where it is determined that the variable Area is larger than the number of total areas, this flow is terminated; otherwise, the flow returns to step S2105.

The above method sets the importance level according to the unsearched time for each area. The time level of each area increases according to the elapsed time after the area was last searched for objects (unsearched time of the area). Thereby, in a case where there is an area that has not been searched for a long time, the importance level increases and the area is searched by panning/tilting.

Importance Level by Camera Vibration State

The importance level is set according to the camera vibration state. The vibration state of the camera 101 (vehicle detection state, imaging state in the placement, and handheld state) is determined from the camera state determined in step S609 of FIG. 6.

In a case where the vibration state of the camera 101 is the "imaging state in the placement", no erroneous calculation of the absolute angle of the camera occurs and the calculation credibility of the importance level of each area is high. Thus, subsequent search control is made by using the importance level of each area as it is.

In a case where the vibration state of the camera 101 is in the "vehicle detection state," the moving velocity is high. Thus, the area of the person riding the vehicle hardly changes, but an object such as a landscape changes moment by moment. Therefore, in the case of the "vehicle detection state," the "IMPORTANCE LEVEL SETTING ACCORDING TO PERSONAL INFORMATION" uses the importance level as it is, but the importance level of the "IMPORTANCE LEVEL SETTING ACCORDING TO IMAGE MOTION INFORMATION" is not used. Since the "IMPORTANCE LEVEL SETTING ACCORDING TO SCENE" and the "IMPORTANCE LEVEL SETTING ACCORDING TO OBJECT RECOGNITION INFORMATION" may change soon, the importance level is reduced. However, the automatic imaging may be modified so that imaging is performed as soon as the object is detected. Each of the "IMPORTANCE LEVEL SETTING ACCORDING TO SOUND INFORMATION" and the "IMPORTANCE LEVEL SETTING ACCORDING TO PAST IMAGING INFORMATION" uses the importance level as it is. A traveling direction of the camera 101 is detected, the traveling direction in which the camera 101 is moving at a high velocity is detected by an acceleration sensor or the like, and calculation is also performed such as increasing the importance level of the area in the traveling direction.

In a case where the vibration state of the camera 101 is the "hand-held state" (state of large vibration), the photographer is highly likely to operate the direction of the camera 101. Accordingly, the importance level for each area is set as follows: The importance level is set high for an area in a range of ±45 degrees from the camera normal position (at which the tilt angle and pan tilt angle are 0 degrees), and the importance level is set low for an area in a range of ±45 degrees to ±90 degrees. The importance level is set lower for an area in a range of higher than ±90 degrees. A method of adding the importance level for each area may be used, or a method of weighting the importance level calculated for each area according to the range may be used. The weighting factor is set to 1 for the area within the range of ±45 degrees, the weighting factor is set to 1 or less for the area within the range of ±45 degrees to ±90 degrees, and the weighting factor is set lower for the range of higher than ±90 degrees.

The above method changes the importance level calculation according to the vibration state of the camera 101 so as to search the object according to the vibration state.

After the importance level of each area obtained by the above method is calculated, the flow proceeds to step S614.

Calculation of Target Angles for Pan/Tilt Searching

In step S614, the control unit 212 calculates target angles for pan/tilt searching from the importance level for each area. The target angles for the pan/tilt searching are calculated by the following method.

First, a final search level is calculated based on the importance levels of areas adjacent to each area. FIGS. 22A and 22B explain searching target angle calculation for each scene. The final search level in an area 2201 of FIG. 22A is calculated based on information on the area 2201 and surrounding areas. A weighting factor for the area 2201 is set to 1 and the other weighting factors are set to 1 or less (for example, 0.5). Then, the final search level is calculated by multiplying the importance level of each area by the weighting factor, and by adding up the calculated values acquired for all areas. This calculation is performed for all areas to calculate the final search level in each area.

Next, an area having the highest final search level is set to the searching target area. In a case where the searching target area is the area 2201 in FIGS. 22A and 22B, the target angles for the pan/tilt searching are calculated from the final search levels of the areas 2201 to 2209 and the central angles of the areas 2201 to 2209 by the following expression (7):

$$y = \sum_{i=1}^{n}\left(b_i \times \frac{a_i}{\sum_{i=0}^{n}a_i}\right) \quad (7)$$

where n is the number of areas, i is a variable defining each area as 1 to 9, b is a central angle of each area, and a is a final search level of each area. Thus, the target angles y for the pan/tilt searching is calculated by calculating the center-of-gravity position y of the angle based on the calculated final search levels among the areas 2201 to 2209 (while y is calculated for each of the tilting direction and the panning direction). In a case where all the values of the final search levels of respective areas are equal to or less than a predetermined threshold, it is determined that there is no important object at that time even if the search is performed and no pan or tilt driving is performed. At this time, the target angle is calculated based on the importance level calculated under the conditions excluding the "IMPORTANCE LEVEL SETTING ACCORDING TO PAST IMAGING INFOR- MATION," and after the camera is panned and/or tilted to the target angle, the angular position is maintained until any one of the final search levels of the respective areas is larger than the predetermined threshold.

The target angles for the pan/tilt searching are calculated as described above, and the flow proceeds to step S615.

Calculation of Pan/Tilt Driving Amounts

In step S615, the control unit 212 calculates the pan/tilt driving amounts based on the image stabilizing amount acquired in step S607 and the target angles for the pan/tilt searching acquired in step S614. By adding a driving angle in control sampling based on the image stabilizing amount and the target angles for the pan/tilt searching, pan/tilt driving amounts (pan driving angle and tilt driving angle) are calculated.

Pan/Tilt Driving

In step S616, the control unit 212 controls driving of the tilt rotation unit 104 and the pan rotation unit 105 via the barrel rotation driving unit 112 according to the pan/tilt driving angles.

Updating Past Imaging Information

In step S617, the past imaging information is updated.

Determining Method of Voltage Amplitude According to Phase Difference

A description will now be given of a method of controlling (determining) a voltage amplitude according to a phase difference between voltages applied to the vibrator 1052 in controlling driving of the pan rotation unit 105. Here, for controlling driving of the pan rotation unit 105 at a low velocity, a phase difference control mode is suitable that controls the velocity by changing the phase difference while fixing the frequency of the voltages applied to the vibrator 1052. FIG. 23 illustrates an example of a relationship between the phase difference between the voltages applied to the vibrator 1052 and the voltage amplitude. In FIG. 23, a horizontal axis represents the phase difference, and a vertical axis represents the voltage amplitude.

In a case where the phase difference has a value (=zero) represented by a dotted line P0, the voltage amplitude has a lower limit value Dmin. In a case where the phase difference is increased so as to increase the driving velocity, the voltage amplitude has conventionally been linearly increased, as indicated by a broken line 2301.

Figure 24A:
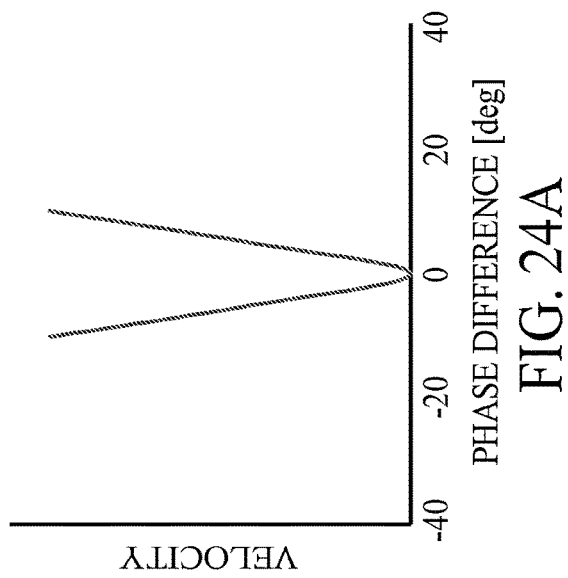
FIGS. 24A to 24C illustrate a relationship between the phase difference between the voltages applied to the vibrator and a driving velocity depending on a difference in voltage amplitude.
Figure 24B:
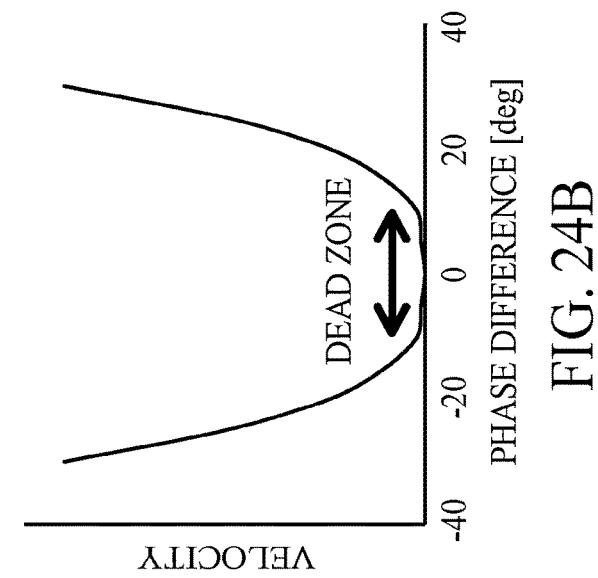
Figure 24C:
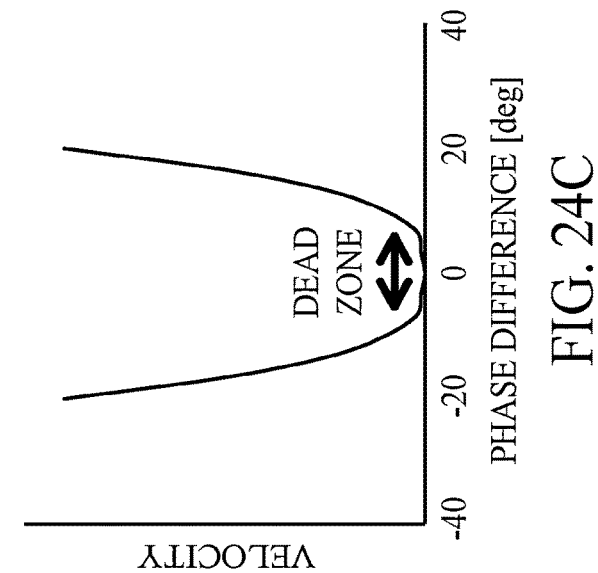

FIGS. 24A to 24C illustrate a relationship between the phase difference between the voltages applied to the vibrator 1052 and the driving velocity depending on a difference in the voltage amplitude. In FIGS. 24A to 24C, a horizontal axis represents the phase difference, and a vertical axis represents the driving velocity. FIG. 24A illustrates a relationship between the phase difference and the driving velocity in a case where the voltage amplitude is set to be sufficiently large, illustrating that the driving velocity changes as the phase difference changes. FIG. 24B illustrates a relationship between the phase difference and the driving velocity in a case where the voltage amplitude is set near the lower limit value Dmin. In a range where the absolute value of the phase difference is small, the change in the driving velocity does not follow the change in the phase difference, and this range causes a wide dead zone in velocity control. That is, it indicates that the velocity controllability is lowered in the case where the voltage amplitude is set near the lower limit value Dmin.

The conventional method of increasing the voltage amplitude in a linear relationship with the phase difference as illustrated by the broken line 2301 in FIG. 23 takes time until the change in the driving velocity follows the change in the phase difference beyond the dead zone of the velocity control, because the change rate of the voltage amplitude is constant. Accordingly, in a case where this embodiment increases the phase difference in order to increase the driving velocity, this embodiment increases the voltage amplitude so that the smaller the absolute value of the phase difference is, the higher the change rate of the voltage amplitude becomes, as indicated by a solid line 2302 in FIG. 23. More specifically, a voltage amplitude k is changed based on a sine wave function as expressed by the following expression (8).

$$k = D\min + (D\max - D\min)\sin\left(\frac{\text{Phase}}{\text{Phase\_max}}\frac{\pi}{2}\right) \quad (8)$$

where Dmin is the lower limit of the voltage amplitude (voltage amplitude in a case where the phase difference is zero), Dmax is the upper limit of the voltage amplitude, Phase is the phase difference, and Phase_max is the maximum phase difference (90° in this embodiment).

The change rate k' of the voltage amplitude is represented by the following expression (9), and the smaller the absolute value of the phase difference is, the higher the change rate of the voltage amplitude becomes.

$$k' = \frac{(D\max - D\min)}{\text{Phase\_max}}\frac{\pi}{2}\cos\left(\frac{\text{Phase}}{\text{Phase\_max}}\frac{\pi}{2}\right) \quad (9)$$

The configuration according to this embodiment can narrow the dead zone of the velocity control in a range where the absolute value of the phase difference is small, as illustrated in FIG. 24C, and suppress the deterioration of the velocity controllability near the lower limit of the voltage amplitude.

Figure 25:
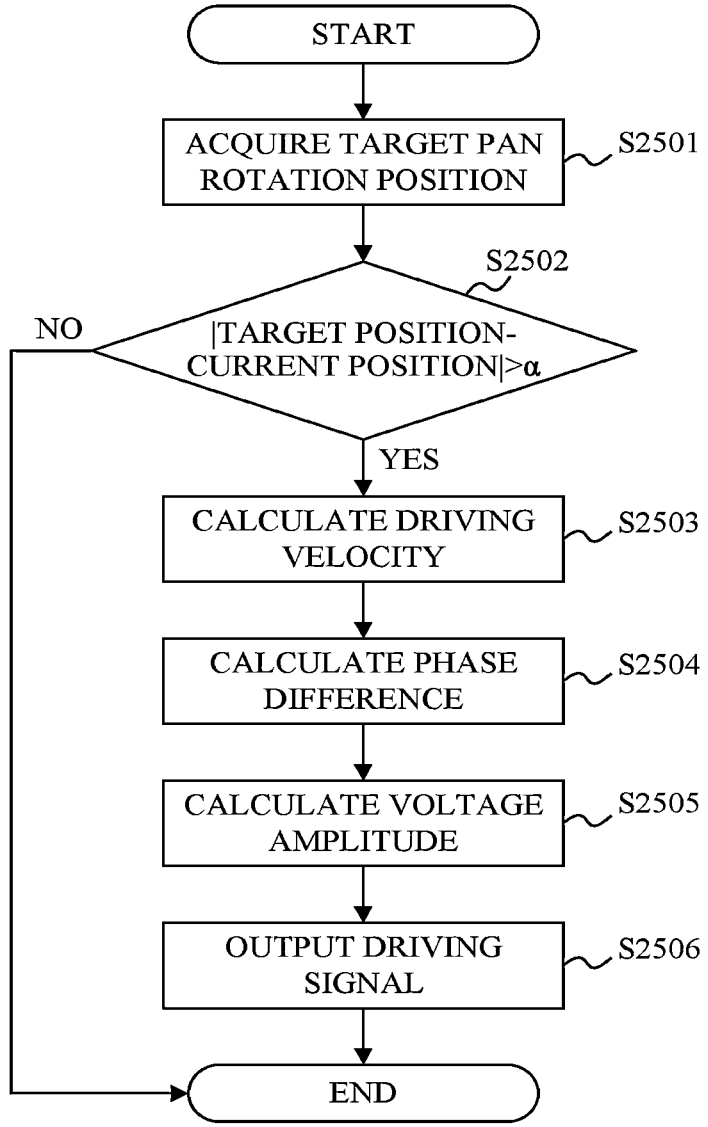
FIG. 25 is a flowchart for explaining a method of determining the voltage amplitude according to the phase difference.

FIG. 25 is a flowchart for explaining a method of controlling (determining) the voltage amplitude according to the phase difference in controlling driving of the pan rotation unit 105.

In step S2501, the target position setting unit 1123 acquires a target pan rotation position based on the rotation instruction from the operation unit 211. The current position of the rotating unit 1051 is obtained from the position calculating unit 1122.

In step S2502, it is determined whether a difference between the current position and the target position of the pan rotation unit 105 is larger than the smallest driving amount α. The smallest driving amount α may be set based on the calculation accuracy of the position calculating unit 1122, or may be set based on a minimum value that causes no overrun in driving the pan rotation unit 105 while the difference between the current position and the target position of the pan rotation unit 105 is changed. The smallest driving amount α may be changed according to the focal length of the zoom unit 201. In a case where it is determined that the difference between the target position and the current position is larger than the smallest driving amount α, the flow proceeds to step S2503; otherwise, this flow ends.

In step S2503, the driving velocity of the pan rotation unit 105 is calculated from the automatic object search condition.

In step S2504, the conversion unit 1127 calculates the phase difference between the two-phase voltages and the frequency using the control amount calculated by the PID calculating unit 1124 based on the deviation between the target position and the current position based on the driving velocity calculated in step S2503.

In step S2505, the conversion unit 1127 calculates the (voltage) amplitude of the two-phase voltages according to the phase difference calculated in step S2504 using the relationship indicated by the solid line 2302 in FIG. 23.

In step S2506, the driving signal generating circuit 1128 generates the driving signal corresponding to the two-phase voltages of the voltage amplitude calculated in step S2505 using the phase difference and frequency calculated in step S2504, and outputs the driving signal to driving circuit 1054.

As described above, the configuration according to this embodiment increases the change rate of the voltage amplitude as the absolute value of the phase difference between the voltages applied to the vibration wave motor decreases. Thereby, this embodiment can secure the control performance of the vibration wave motor while reducing the driving noise caused by unnecessary vibrations in driving the vibration wave motor at low velocity.

Voltage Amplitude Determining Method Using Phase Difference-Driving Velocity Characteristic The method for controlling (determining) the voltage amplitude based on the sine wave function has been described, but a relationship between the phase difference between the voltages applied to the vibrator 1052 and the driving velocity is affected by the friction and the driving load of the driving unit and thus is changed according to operation environments and individual differences. Accordingly, the relationship between the phase difference between the voltages applied to the vibrator 1052 and the driving velocity may be measured, and the voltage amplitude may be controlled (determined) based on the phase difference-driving velocity characteristic obtained from the measurement result.

Figure 26:
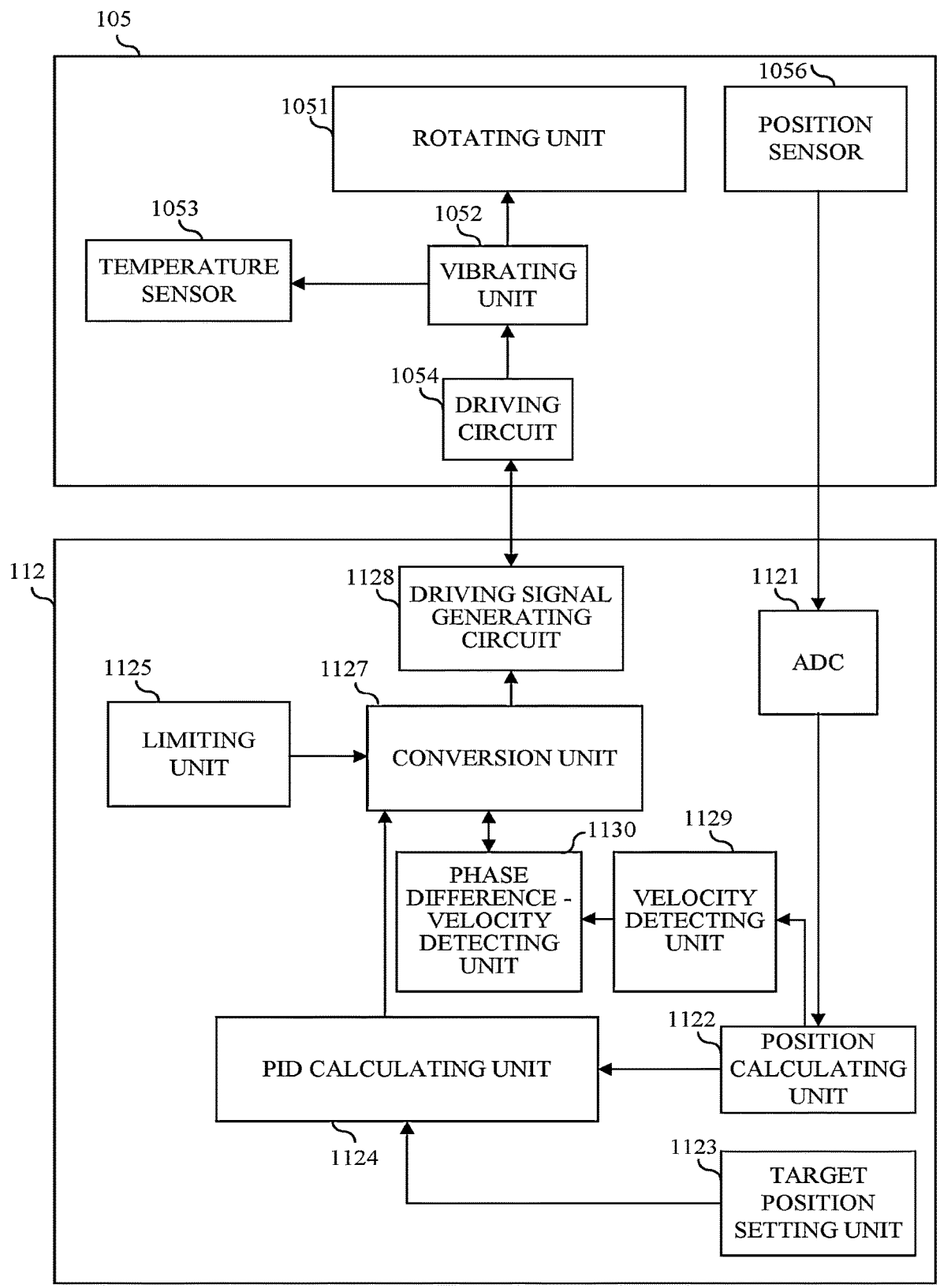
FIG. 26 is a block diagram of a pan rotation unit and a barrel rotation driving unit.

FIG. 26 is a block diagram of the pan rotation unit 105 and the barrel rotation driving unit 112. A velocity detecting unit (first detecting unit) 1129 detects the driving velocity from the change amount in the current position acquired by the position calculating unit 1122. A phase difference-velocity detecting unit (second detecting unit) 1130 detects the relationship between the phase difference calculated by the conversion unit 1127 and the driving velocity detected by the velocity detecting unit 1129. Since other configurations are similar to those described with reference to FIG. 3, a detailed description thereof will be omitted.

Figure 27:
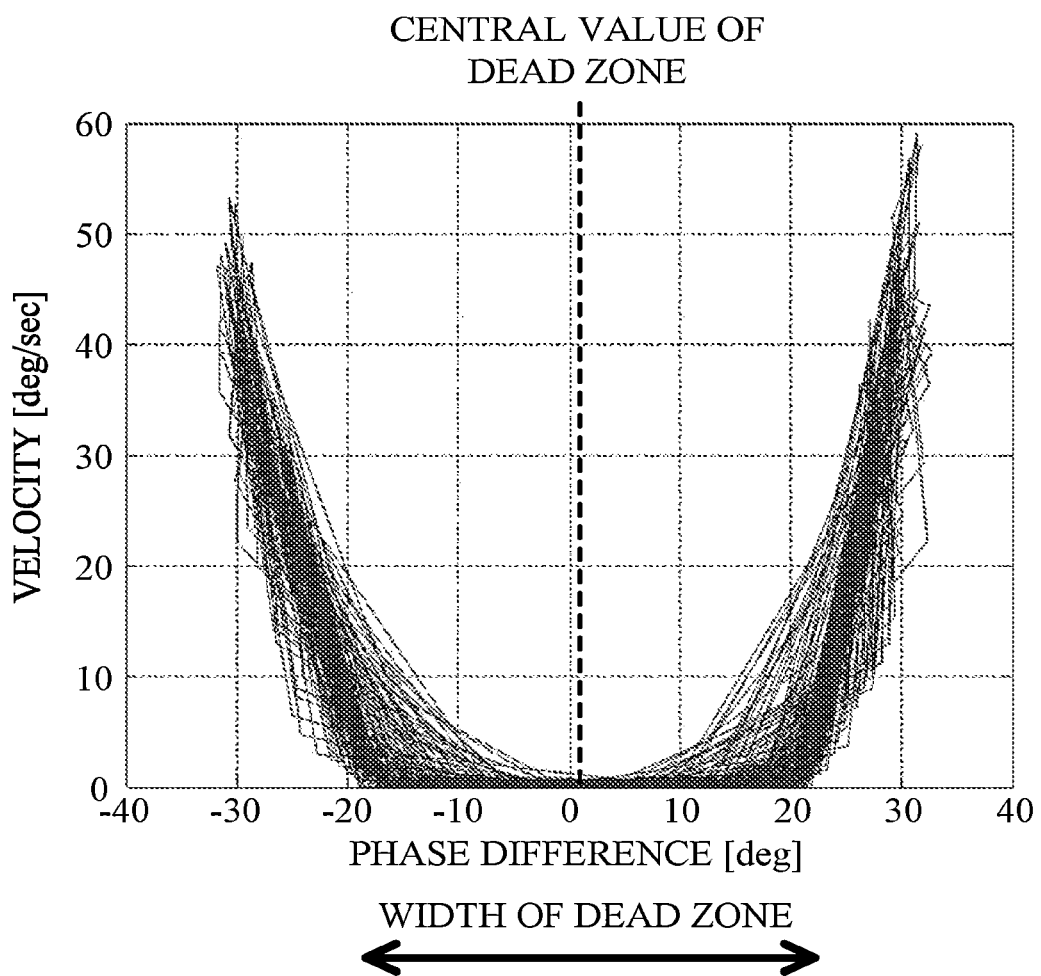
FIG. 27 illustrates an example of measurement data of the phase difference and the driving velocity.

FIG. 27 illustrates an example of measurement data of the phase difference and the driving velocity detected by the phase difference-velocity detecting unit 1130 in a case where the voltage amplitude of the voltages applied to the vibrator 1052 is set to the lower limit value Dmin while the phase difference is changed in a predetermined range (0° to 30° and 0° to −30° in this embodiment). In FIG. 27, a horizontal axis represents the phase difference, and a vertical axis represents the driving velocity.

Based on the measurement data detected by the phase difference-velocity detecting unit 1130, a range in which the driving velocity does not exceed a predetermined value even if the phase difference changes is set to the dead zone, and the width and central value (central phase difference) of the dead zone are calculated and stored. From the measurement data, the change rate of the driving velocity (phase difference-velocity characteristic) at each phase difference is calculated and stored. In a case where the phase difference is included in the dead zone in driving the pan rotation unit 105, the voltage amplitude is controlled (determined) according to a difference between the phase difference and the central value of the dead zone and a reciprocal of the change rate of the driving velocity. Since the change rate of the voltage amplitude is increased as the change rate of the driving velocity decreases, the dead zone of the velocity control can be narrowed, and the deterioration of the velocity controllability can be suppressed near the lower limit of the voltage amplitude.

Figure 28:
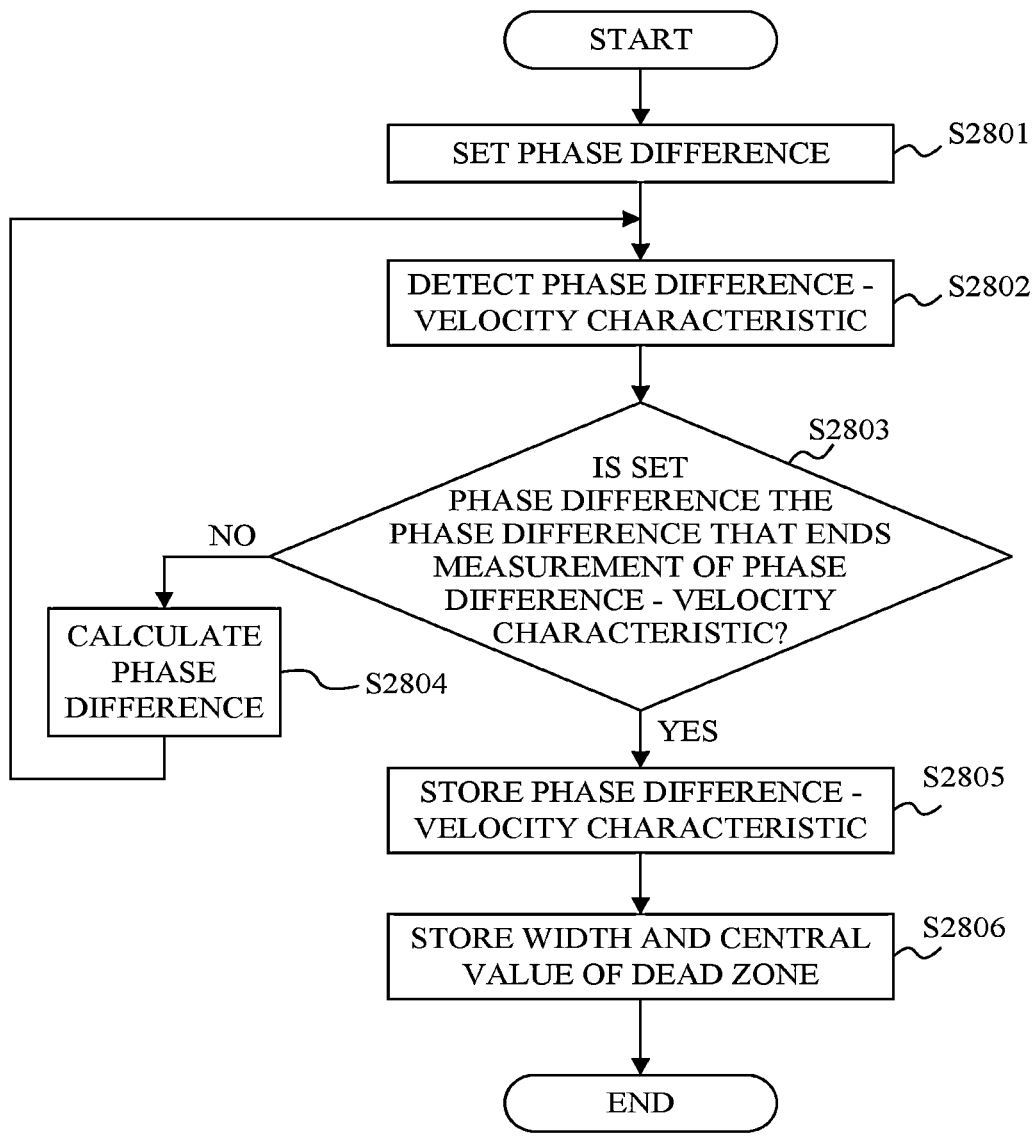
FIG. 28 is a flowchart for measuring and storing a phase difference-velocity characteristic.

FIG. 28 is a flowchart for measuring and storing the phase difference-velocity characteristic. The phase difference-velocity characteristic is measured and stored in initializing the tilt rotation unit 104 and the pan rotation unit 105 in the processing of step S601 described with reference to FIG. 6.

In step S2801, a phase difference (0° in this embodiment) for starting the measurement of the phase difference-velocity characteristic is set. The voltage amplitude is set to the lower limit value Dmin.

In step S2802, the phase difference-velocity detecting unit 1130 detects the change rate of the driving velocity corresponding to each phase difference from the driving velocity corresponding to each phase difference detected by the velocity detecting unit 1129.

In step S2803, it is detected whether the set phase difference is the phase difference that ends the measurement of the phase difference-velocity characteristic (30° or −30° in this embodiment). In a case where it is determined that the set phase difference is the phase difference that ends the measurement of the phase difference-velocity characteristic, the flow proceeds to step S2805; otherwise, the flow proceeds to step S2804.

In step S2804, the phase difference is changed.

In step S2805, the driving velocity and the change rate of the driving velocity corresponding to each phase difference are associated with the set phase difference and stored as the phase difference-velocity characteristic.

In step S2806, the width and the central value of the dead zone where the driving velocity does not exceed a predetermined value even if the phase difference changes, are calculated from the driving velocity corresponding to each phase difference and stored.

This embodiment measures the phase difference-velocity characteristic, and calculates the width and central value of the dead zone and the change rate of the driving velocity in the initial setting after the apparatus is started, but may execute them in a calibration operation in response to the instruction of the user. Alternatively, the measurement result of the phase difference-velocity characteristic may be stored for a predetermined number of times, and the width and central value of the dead zone and the change rate of the driving velocity may be calculated based on the average value.

As described above, the configuration according to this embodiment increases the change rate of the voltage amplitude as the absolute value of the phase difference between the voltages applied to the vibration wave motor decreases, and thus can suppress noise and maintain the control performance in driving the vibration wave motor at a low velocity.

Countermeasure where Phase Difference at Center of Dead Zone Shifts from 0°

Each of the dead zones illustrated in FIGS. 24A to 24C illustrates an example in which the phase difference at the center of the dead zone is 0°. The phase difference at the center of the dead zone is influenced by the friction and the driving load of the driving unit, and thus is changed according to operation environments. Thus, in a case where the phase difference at the center of the dead zone shifts from 0°, a measure of increasing the change rate of the voltage amplitude as the absolute value of the phase difference decreases, and a measure of using a previously prepared measurement result of the phase difference-velocity characteristic may not be so effective.

A description will now be given of a method of determining the change rate of the voltage amplitude from the target velocity of the pan rotation unit 105 based on the voltage amplitude-velocity characteristic as a countermeasure in a case where the phase difference at the center of the dead zone changes according to the operation environment. However, the basic flow is similar to a flow of the dead zone countermeasure illustrated in FIG. 25 that increases the change rate of the voltage amplitude as the absolute value of the phase difference decreases. The method of determining the voltage amplitude in step S2505 is different.

Figure 29:
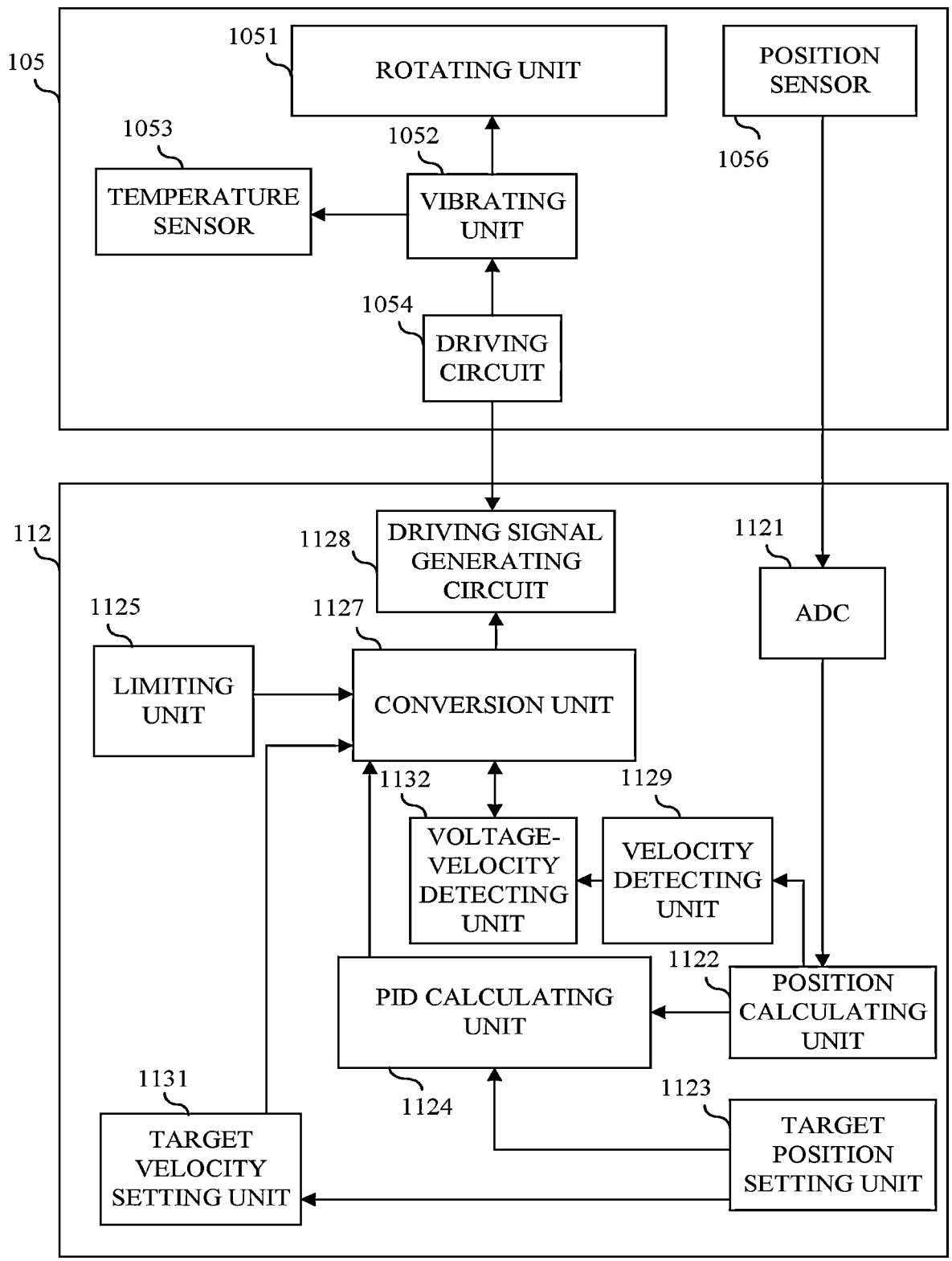
FIG. 29 is a block diagram of a pan rotation unit and a barrel rotation driving unit.

FIG. 29 is a block diagram of the pan rotation unit 105 and the barrel rotation driving unit 112 in this embodiment. A difference between the configuration of FIG. 29 and the configuration of FIG. 26 is that the phase difference-velocity detecting unit 1130 is replaced with a voltage-velocity detecting unit 1132 and a target velocity setting unit 1131 is added. Since other configurations are similar to those described with reference to FIG. 26, a detailed description thereof will be omitted.

The target velocity setting unit 1131 sets a result of calculating the target velocity from a change amount (differential value) of the target position set by the target position setting unit 1123. The voltage-velocity detecting unit 1132 detects a relationship between the voltage amplitude of the two-phase voltage determined by conversion unit 1127 and the driving velocity detected by velocity detecting unit 1129.

The PID calculating unit 1124 performs the well-known PID calculation and calculates a control amount using as an input a deviation, which is a difference between the target position of the pan rotation unit 105 set by the target position setting unit 1123 and an actual position of the pan rotation unit 105 detected by the position calculating unit 1122. The conversion unit 1127 determines a phase difference between the two-phase voltages based on the control amount calculated by the PID calculating unit 1124, and determines the amplitude of the two-phase voltages based on the target velocity set by the target velocity setting unit 1131 and the voltage-velocity characteristic detected by the voltage-velocity detecting unit 1132. A procedure for detecting the voltage-velocity characteristic by the voltage-velocity detecting unit 1132 will be described.

Figures 30, 31:
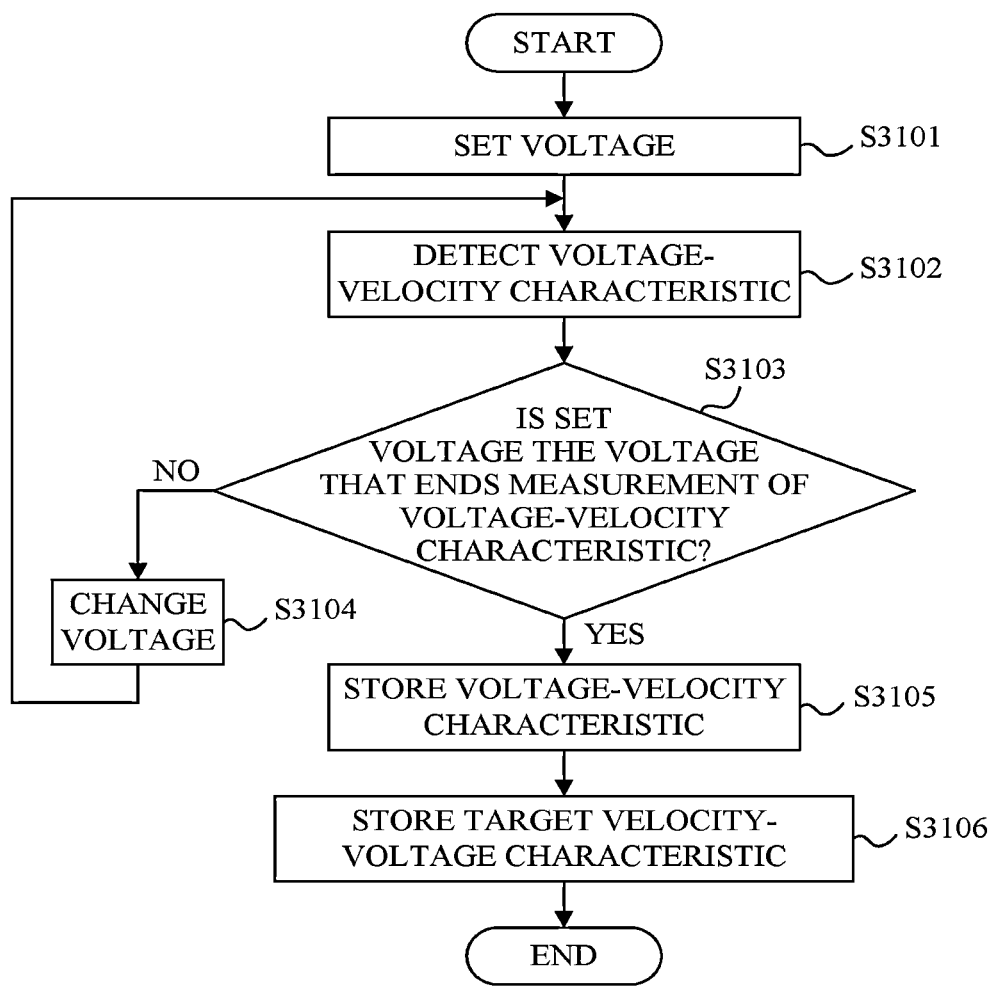
FIG. 30 illustrates an example of measurement data of the voltage amplitude and the driving velocity.
FIG. 31 is a flowchart for measuring and storing a voltage amplitude-velocity characteristic.

FIG. 31 is a flowchart illustrating processing of measuring and storing the voltage-velocity characteristic. The voltage-velocity characteristic is measured and stored in the initial settings of the tilt rotation unit 104 and the pan rotation unit 105 in the step S601 described with reference to FIG. 6.

In step S3101, the voltage (0V in this embodiment) for starting measurement of the voltage-velocity characteristic is set. This embodiment sets the phase difference to 90° as the upper limit value (which is a phase difference that maximizes the driving velocity).

In step S3102, the driving velocity for the voltage is detected based on a driving velocity at each voltage detected by the velocity detecting unit 1129.

In step S3103, it is detected whether or not the set voltage is the voltage (Dmax in this embodiment) that ends the measurement of the voltage-velocity characteristic. In a case where it is determined that the set voltage is the voltage that ends the measurement of the voltage-velocity characteristic, the flow proceeds to step S3105; otherwise, the flow proceeds to step S3104 to change the voltage. In step S3105, the driving velocity corresponding to each voltage measured in step S3102 is stored as the voltage-velocity characteristic in the form illustrated in FIG. 30.

In step S3106, the target velocity-voltage characteristic is calculated from the voltage-velocity characteristic and stored. A method of calculating the target velocity-voltage characteristic will be described.

Where k is an amplitude voltage in a case where the target velocity SPD is given, the target velocity-voltage characteristic is expressed by the following expression (10):

$$k = D\min + (D\max - D\min)\sin\left(\frac{SPD}{SPD\_max}\frac{\pi}{2}\right) \quad (10)$$

where Dmin is a lower limit of the voltage amplitude (voltage amplitude in a case where the target velocity is 0), Dmax is an upper limit of the voltage amplitude, and SPD_max is a velocity where the voltage amplitude is Dmax and the phase difference is maximum (90° in this embodiment). A change rate k' of the voltage amplitude against the target velocity is expressed by the following expression (11), and the smaller the target velocity SPD is, the higher the change rate of the voltage amplitude becomes:

$$k' = \frac{(D\max - D\min)}{SPD\_max}\frac{\pi}{2}\cos\left(\frac{SPD}{SPD\_max}\frac{\pi}{2}\right) \quad (11)$$

This embodiment assumes that the operation of calculating and storing the target velocity-voltage characteristic from the voltage-velocity characteristic is executed in the initial setting at the startup of the apparatus. Another method may be a method of measuring and storing the target velocity-voltage characteristic at the timing instructed by the user. Alternatively, steps S3101 to S3104 may be repeated a predetermined number of times in one set, and SPD_max in expression (10) may be calculated and set based on a characteristic of an average value of velocity detection results at each voltage.

Another method may be finding an approximate function of the target velocity-voltage characteristic using the least squares method. A description will now be given of a method of finding an approximation function of the target velocity-voltage characteristic using the least squares method. First, coefficients a, b, and c are found from the voltage-velocity characteristic stored in step S3105 by setting the approximate function of the target velocity-voltage characteristic to the following expression (12):

$$SPD = ak^2 + bk + c \quad (12)$$

Next, a, b, and c are found where an error function L expressed by expression (13) is minimum, based on the voltage-velocity characteristic stored in step S3105 and expression (14). Expression (14) is a simultaneous equation created under the condition that the partial differentiation results of L in expression (13) with respect to a, b, and c are zero. N in expressions (13) and (14) denotes the number of detections of the voltage-velocity characteristic in S3102, and N=4 in this embodiment, as illustrated in FIG. 30.

$$L(a, b, c) = \sum_{i=1}^{N}\{SPD_i - (ak_i^2 + bk_i + c)\}^2 \quad (13)$$

$$\begin{pmatrix} a \\ b \\ c \end{pmatrix} = \begin{pmatrix} \sum_{i=1}^{N} k_i^4 & \sum_{i=1}^{N} k_i^3 & \sum_{i=1}^{N} k_i^2 \\ \sum_{i=1}^{N} k_i^3 & \sum_{i=1}^{N} k_i^2 & \sum_{i=1}^{N} k_i \\ \sum_{i=1}^{N} k_i^2 & \sum_{i=1}^{N} k_i & \sum_{i=1}^{N} 1 \end{pmatrix}^{-1} \begin{pmatrix} \sum_{i=1}^{N} k_i^2 SPD_i \\ \sum_{i=1}^{N} k_i SPD_i \\ \sum_{i=1}^{N} SPD_i \end{pmatrix} \quad (14)$$

From expression (12), the voltage amplitude is expressed by expression (15). The conversion unit 1127 converts the target velocity SPD set by the target velocity setting unit 1131 into the voltage amplitude calculated by expression (15).

$$k = \frac{-b + \sqrt{b^2 - 4a(c - SPD)}}{2a} \quad (15)$$

This embodiment has discussed a method that uses an approximate expression and the second-order least squares method, but may use an approximate expression of a polynomial equal to or higher than the second order. Any other approximate method, such as exponential approximation or exponential approximation, can be used as long as the change rate of the voltage amplitude increases as the target velocity decreases.

As described above, the configuration according to this embodiment increases the change rate of the voltage amplitude as the target driving velocity of the vibration wave motor decreases, and can suppress the deterioration of the control performance due to the influence of the dead zone even if the phase difference at the center of the dead zone changes. As a result, this embodiment can suppress noise and secure the control performance in driving the vibration wave motor at a low velocity regardless of the operation environment.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

The disclosure of this embodiment includes the following configurations and methods.

(Configuration 1)

A driving control apparatus configured to control a driving unit that moves relative to each other a vibrator that is excited to vibrate by applying a first driving signal and a second driving signal that have a phase difference with each other, and a contact member that contacts the vibrator, the driving control apparatus comprising at least one processor, and a memory coupled to the at least one processor, the memory having instructions that, in a case where executed by the processor, perform operations as:

a first control unit configured to control the phase difference; and a second control unit configured to control a voltage amplitude of each of the first driving signal and the second driving signal, wherein the second control unit controls the voltage amplitude so that a change rate of the voltage amplitude increases as an absolute value of the phase difference decreases.

(Configuration 2)

The image pickup apparatus according to Configuration 1, wherein the driving unit is a vibration wave motor that vibrates based on a signal applied to each of two electrodes.

(Configuration 3)

The driving control apparatus according to configuration 1 or 2, wherein the change rate of the voltage amplitude is determined based on a sine wave function.

(Configuration 4)

The driving control apparatus according to any one of Configurations 1 to 3, wherein the instructions further performs operations as:

a first detecting unit configured to detect a driving velocity of the driving unit; and a second detecting unit configured to detect a relationship between the phase difference and the driving velocity.

(Configuration 5)

The driving control apparatus according to Configuration 4, wherein the second detecting unit detects a width of the phase difference and a central phase difference of a dead zone in which a change amount of the driving velocity relative to a change amount of the phase difference is smaller than a predetermined value, and wherein the change rate of the voltage amplitude is controlled so that the closer the phase difference is to the central phase difference, the larger the phase difference becomes.

(Configuration 6)

The driving control apparatus according to Configuration 4 or 5, wherein the change rate of the voltage amplitude is controlled based on a reciprocal of the phase difference and a change rate of the driving velocity.

(Configuration 7)

An image pickup apparatus comprising:

the driving control apparatus according to any one of Configurations 1 to 6; and an imaging unit configured to capture an object and generates an image.

(Method 1)

A control method configured to control a driving unit that moves relative to each other a vibrator that is excited to vibrate by applying a first driving signal and a second driving signal that have a phase difference with each other, and a contact member that contacts the vibrator, the control method comprising:
  a first control step configured to control the phase difference; and
  a second control step configured to control a voltage amplitude of each of the first driving signal and the second driving signal,
  wherein the second control step controls the voltage amplitude so that a change rate of the voltage amplitude increases as an absolute value of the phase difference decreases.

(Configuration 8)

A driving control apparatus that controls a driving unit that moves a vibrator that is excited to vibrate by applying a first driving signal and a second driving signal that have a phase difference with each other, and a contact member that contacts the vibrator relative to each other, the driving control apparatus comprising at least one processor, and a memory coupled to the at least one processor, the memory having instructions that, in a case where executed by the processor, performs operations as:
  a first control unit that controls the phase difference; and
  a second control unit for controlling the voltage amplitudes of the first driving signal and the second driving signal,
  wherein the second control unit controls the voltage amplitude such that the change rate of the voltage amplitude increases as the target velocity of the driving unit decreases.

(Configuration 9)

The driving control apparatus according to configuration 8, wherein the driving unit is a vibration wave motor that vibrates based on a signal applied to each of two electrodes.

(Configuration 10)

The driving control apparatus according to configuration 8 or 9, wherein the change rate of the voltage amplitude is determined based on a sine wave function.

(Configuration 11)

The driving control apparatus according to any one of Configurations 8 to 10, wherein the instructions further performs operations as:
  a first detecting unit configured to detect a driving velocity of the driving unit; and
  a second detecting unit configured to detect a relationship between the phase difference and the driving velocity.

(Configuration 12)

The driving control apparatus according to Configuration 11, wherein the change rate of the voltage amplitude is controlled based on the change rate of the voltage amplitude and the driving velocity.

(Composition 13)

An image pickup apparatus comprising:
  the driving control apparatus according to any one of Configurations 8 to 12; and
  an imaging unit configured to capture an object and generates an image.

(Method 2)

A control method configured to control a driving unit that moves relative to each other a vibrator that is excited to vibrate by applying a first driving signal and a second driving signal that have a phase difference with each other, and a contact member that contacts the vibrator, the control method comprising:
  a first control step configured to control the phase difference; and
  a second control step configured to control a voltage amplitude of each of the first driving signal and the second driving signal,
  wherein the second control step controls the voltage amplitude so that a change rate of the voltage amplitude increases as a target velocity of the driving unit decreases.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199261, filed on Dec. 8, 2021, and No. 2022-145279, filed on Sep. 13, 2022, each of which is hereby incorporated by reference herein in its entirety.

What is claimed is:

1. A driving control apparatus configured to control a driving unit that moves relative to each other a vibrator that is excited to vibrate by applying a first driving signal and a second driving signal that have a phase difference with each other, and a contact member that contacts the vibrator, the driving control apparatus comprising at least one processor, and a memory coupled to the at least one processor, the memory having instructions that, in a case where executed by the processor, perform operations as:
  a first control unit configured to control the phase difference; and
  a second control unit configured to control a voltage amplitude of each of the first driving signal and the second driving signal,
  wherein the second control unit controls the voltage amplitude so that a change rate of the voltage amplitude increases as an absolute value of the phase difference decreases.

2. The driving control apparatus according to claim 1, wherein the driving unit is a vibration wave motor that vibrates based on a signal applied to each of two electrodes.

3. The driving control apparatus according to claim 1, wherein the change rate of the voltage amplitude is determined based on a sine wave function.

4. The driving control apparatus according to claim 1, wherein the instructions further performs operations as:
  a first detecting unit configured to detect a driving velocity of the driving unit; and
  a second detecting unit configured to detect a relationship between the phase difference and the driving velocity.

5. The driving control apparatus according to claim 4, wherein the second detecting unit detects a width of the phase difference and a central phase difference of a dead zone in which a change amount of the driving velocity relative to a change amount of the phase difference is smaller than a predetermined value, and
  wherein the change rate of the voltage amplitude is controlled so that the closer the phase difference is to the central phase difference, the larger the phase difference becomes.

6. The driving control apparatus according to claim 4, wherein the change rate of the voltage amplitude is controlled based on a reciprocal of the phase difference and a change rate of the driving velocity.

7. An image pickup apparatus comprising:
  the driving control apparatus according to claim 1; and
  an imaging unit configured to capture an object and generates an image.

8. A control method configured to control a driving unit that moves relative to each other a vibrator that is excited to vibrate by applying a first driving signal and a second driving signal that have a phase difference with each other, and a contact member that contacts the vibrator, the control method comprising:

a first control step configured to control the phase difference; and a second control step configured to control a voltage amplitude of each of the first driving signal and the second driving signal, wherein the second control step controls the voltage amplitude so that a change rate of the voltage amplitude increases as an absolute value of the phase difference or a target velocity of the driving unit decreases.

9. A driving control apparatus configured to control a driving unit that moves relative to each other a vibrator that is excited to vibrate by applying a first driving signal and a second driving signal that have a phase difference with each other, and a contact member that contacts the vibrator, the driving control apparatus comprising at least one processor, and a memory coupled to the at least one processor, the memory having instructions that, in a case where executed by the processor, perform operations as:

a first control unit configured to control the phase difference; and a second control unit configured to control a voltage amplitude of each of the first driving signal and the second driving signal, wherein the second control unit controls the voltage amplitude so that a change rate of the voltage amplitude increases as a target velocity of the driving unit decreases.

10. The driving control apparatus according to claim 9, wherein the driving unit is a vibration wave motor that vibrates based on a signal applied to each of two electrodes.

11. The driving control apparatus according to claim 9, wherein the change rate of the voltage amplitude is determined based on a sine wave function.

12. The driving control apparatus according to claim 9, wherein the instructions further performs operations as:

a first detecting unit configured to detect a driving velocity of the driving unit; and a second detecting unit configured to detect a relationship between the phase difference and the driving velocity.

13. The driving control apparatus according to claim 12, wherein the change rate of the voltage amplitude is controlled based on the voltage amplitude and a change rate of the driving velocity.

14. An image pickup apparatus comprising:

the driving control apparatus according to claim 9; and an imaging unit configured to capture an object and generates an image.

* * * * *